(12) United States Patent
Smith et al.

(10) Patent No.: US 11,407,460 B2
(45) Date of Patent: Aug. 9, 2022

(54) NONLINEAR WALKING APPARATUS

(71) Applicant: Entro Industries, Inc., Hillsboro, OR (US)

(72) Inventors: Harlan B. Smith, Hillsboro, OR (US); Shawn R. Smith, Hillsboro, OR (US); Jason Ross, Hillsboro, OR (US); Raymond Rafe Rouse, Hillsboro, OR (US)

(73) Assignee: ENTRO INDUSTRIES, INC., Hillsboro, OR (US)

(*) Notice: Subject to any disclaimer, the term of this patent is extended or adjusted under 35 U.S.C. 154(b) by 404 days.

(21) Appl. No.: 16/414,444

(22) Filed: May 16, 2019

(65) Prior Publication Data
US 2019/0367111 A1 Dec. 5, 2019

Related U.S. Application Data

(60) Provisional application No. 62/742,691, filed on Oct. 8, 2018, provisional application No. 62/678,872, filed on May 31, 2018.

(51) Int. Cl.
*B62D 57/02* (2006.01)
(52) U.S. Cl.
CPC .................... *B62D 57/02* (2013.01)
(58) Field of Classification Search
CPC ..................................... B62D 57/02
USPC ........................................... 180/8.1
See application file for complete search history.

(56) References Cited

U.S. PATENT DOCUMENTS

| | | | |
|---|---|---|---|
| 1,001,299 | A | 8/1911 | Page |
| 1,242,635 | A | 10/1917 | Anderson |
| 1,289,207 | A | 12/1918 | Leach |
| 1,429,551 | A | 9/1922 | Anderson |
| 1,615,055 | A | 1/1927 | Turner |
| 1,627,249 | A | 5/1927 | Page |

(Continued)

FOREIGN PATENT DOCUMENTS

| | | |
|---|---|---|
| CA | 2798743 | 8/2015 |
| CA | 2798774 | 9/2015 |

(Continued)

OTHER PUBLICATIONS

Airstream Inc., "Airstream's New Dura-Torque Axle" Pamphlet. 1962.

(Continued)

*Primary Examiner* — Kevin Hurley
*Assistant Examiner* — Felicia L. Brittman
(74) *Attorney, Agent, or Firm* — Schwabe Williamson & Wyatt

(57) ABSTRACT

A load transporting apparatus is configured to move a load bearing frame carrying a load over a base surface. A support foot provides a first load bearing surface. A lift mechanism during a step operation raises the support foot off of the base surface, lowers the support foot onto the base surface, and raise the load off of the base surface. A first travel mechanism moves the lift mechanism and attached load along a non-linear horizontal path and a second travel mechanism moves the lift mechanism along a different horizontal path. A control system operates the first travel mechanism and the second travel mechanism to move the lift mechanism along a selected horizontal path.

10 Claims, 15 Drawing Sheets

(56) References Cited

U.S. PATENT DOCUMENTS

| | | |
|---|---|---|
| 1,692,121 A | 11/1928 | Grant |
| 1,879,446 A | 2/1931 | Page |
| 1,914,692 A | 6/1933 | Kakaska |
| 1,915,134 A | 6/1933 | MacPherson |
| 2,132,184 A | 10/1937 | Poche |
| 2,164,120 A | 6/1939 | Page |
| 2,247,782 A | 7/1941 | Martinson |
| 2,259,200 A | 10/1941 | Cameron et al. |
| 2,290,118 A | 7/1942 | Page |
| 2,380,431 A | 7/1945 | Harding |
| 2,399,375 A | 4/1946 | Mullins |
| 2,452,632 A | 11/1948 | McLeod |
| 2,541,496 A | 2/1951 | Busick, Jr. |
| 2,616,677 A | 11/1952 | Compton |
| 2,644,691 A | 7/1953 | Pohle |
| 2,660,253 A | 11/1953 | Davidson |
| 2,660,449 A | 11/1953 | MacPherson |
| 2,692,770 A | 10/1954 | Nallinger et al. |
| 2,914,127 A | 8/1955 | Ricouard |
| 2,777,528 A | 1/1957 | Jourdain |
| 2,901,240 A | 8/1959 | Fikse |
| 2,935,309 A | 5/1960 | McCarthy |
| 2,942,676 A | 6/1960 | Wilhelm |
| 3,078,941 A | 2/1963 | Baron |
| 3,113,661 A | 12/1963 | Linke et al. |
| 3,135,345 A | 6/1964 | Scruggs |
| 3,150,733 A | 9/1964 | Goebel |
| 3,249,168 A | 5/1966 | Klein |
| 3,255,836 A | 6/1966 | Hoppmann et al. |
| 3,265,145 A | 8/1966 | Beitzel |
| 3,334,849 A | 8/1967 | Bronder |
| 3,362,553 A | 1/1968 | Weinmann |
| 3,375,892 A | 4/1968 | Kraschnewski et al. |
| 3,446,301 A | 5/1969 | Thomas |
| 3,448,994 A | 6/1969 | King et al. |
| 3,490,786 A | 1/1970 | Ravenel |
| 3,493,064 A | 2/1970 | Wilson |
| 3,512,597 A | 5/1970 | Baron |
| 3,527,313 A | 9/1970 | Reimann |
| 3,528,341 A | 9/1970 | Rieschel |
| 3,576,225 A | 4/1971 | Chambers |
| 3,595,322 A | 7/1971 | Reimann |
| 3,612,201 A | 10/1971 | Smith |
| 3,638,747 A | 2/1972 | Althoff |
| 3,674,103 A | 7/1972 | Kiekhaefer |
| 3,734,220 A | 5/1973 | Smith |
| 3,754,361 A | 8/1973 | Branham |
| 3,765,499 A | 10/1973 | Harmala |
| 3,767,064 A | 10/1973 | Lutz |
| 3,767,224 A | 10/1973 | Schneeweiss |
| 3,796,276 A | 3/1974 | Maeda |
| 3,807,519 A | 4/1974 | Patch |
| 3,853,196 A | 12/1974 | Guest |
| 3,866,425 A | 2/1975 | Morrice |
| 3,866,835 A | 2/1975 | Dowd |
| 3,921,739 A | 11/1975 | Rich et al. |
| 3,951,225 A | 4/1976 | Schewenk |
| 4,014,399 A | 3/1977 | Ruder |
| 4,021,978 A | 5/1977 | Busse |
| 4,048,936 A | 9/1977 | Uchizono |
| RE29,541 E | 2/1978 | Russell |
| 4,135,340 A | 1/1979 | Cox |
| 4,206,935 A | 6/1980 | Sheppard et al. |
| 4,252,204 A | 2/1981 | Bishop |
| 4,290,495 A | 9/1981 | Elliston |
| 4,296,820 A | 10/1981 | Loftis |
| 4,324,077 A | 4/1982 | Woolslayer |
| 4,324,302 A | 4/1982 | Rabinovitch |
| 4,334,587 A | 6/1982 | Rangaswamy |
| 4,371,041 A | 2/1983 | Becker |
| 4,375,892 A | 3/1983 | Jenkins |
| 4,405,019 A | 9/1983 | Frisbee |
| 4,406,339 A | 9/1983 | Spencer |
| 4,423,560 A | 1/1984 | Rivinius |
| 4,489,954 A | 12/1984 | Yasui et al. |
| 4,491,449 A | 1/1985 | Hawkins |
| 4,555,032 A | 11/1985 | Mick |
| 4,655,467 A | 4/1987 | Kitzmiller et al. |
| 4,759,414 A | 7/1988 | Willis |
| 4,790,400 A * | 12/1988 | Sheeter ............... B62D 57/00 180/8.1 |
| 4,821,816 A | 4/1989 | Willis |
| 4,823,870 A | 4/1989 | Sorokan |
| 4,831,795 A | 5/1989 | Sorokan |
| 4,842,298 A | 6/1989 | Jarvis |
| 5,015,147 A | 5/1991 | Taylor |
| 5,178,406 A | 1/1993 | Reynolds |
| 5,245,882 A | 9/1993 | Kallenberger |
| 5,248,005 A | 9/1993 | Mochizuki |
| 5,398,396 A | 3/1995 | Sanders |
| 5,492,436 A | 2/1996 | Suksumake |
| 5,575,346 A | 11/1996 | Yberle |
| 5,600,905 A | 2/1997 | Kallenberger |
| 5,603,174 A | 2/1997 | Kallenberger |
| 5,613,444 A | 3/1997 | Ahmadian et al. |
| 5,749,596 A | 5/1998 | Jensen et al. |
| 5,794,723 A | 8/1998 | Caneer |
| 5,921,336 A | 7/1999 | Reed |
| 6,089,583 A | 7/2000 | Taipale |
| 6,202,774 B1 | 3/2001 | Claassen et al. |
| 6,203,247 B1 | 3/2001 | Schellstede |
| 6,345,831 B1 | 2/2002 | deMarcellus |
| 6,474,926 B2 | 11/2002 | Weiss |
| 6,554,145 B1 | 4/2003 | Fantuzzi |
| 6,554,305 B2 | 4/2003 | Fulks |
| 6,581,525 B2 | 6/2003 | Smith |
| 6,612,781 B1 | 9/2003 | Jackson |
| 6,651,991 B2 | 11/2003 | Carlstedt et al. |
| 6,820,887 B1 | 11/2004 | Riggle |
| 6,857,483 B1 | 2/2005 | Dirks |
| 6,962,030 B2 | 11/2005 | Conn |
| 7,182,163 B1 | 2/2007 | Gipson |
| 7,308,953 B2 | 12/2007 | Barnes |
| 7,357,616 B2 | 4/2008 | Andrews |
| 7,681,674 B1 | 3/2010 | Barnes et al. |
| 7,806,207 B1 | 10/2010 | Barnes et al. |
| 7,819,209 B1 | 10/2010 | Bezner |
| 7,882,915 B1 | 2/2011 | Wishart |
| 8,019,472 B2 | 9/2011 | Montero |
| 8,051,930 B1 | 11/2011 | Barnes et al. |
| 8,250,816 B2 | 8/2012 | Donnally |
| 8,468,753 B2 | 6/2013 | Donnally |
| 8,490,724 B2 | 7/2013 | Smith et al. |
| 8,490,727 B2 | 7/2013 | Smith et al. |
| 8,544,853 B2 | 10/2013 | Kanaoka |
| 8,556,003 B2 | 10/2013 | Souchek |
| 8,561,733 B2 | 10/2013 | Smith et al. |
| 8,573,334 B2 | 11/2013 | Smith |
| 8,646,549 B2 | 2/2014 | Ledbetter |
| 8,646,976 B2 | 2/2014 | Stoik |
| 8,839,892 B2 | 9/2014 | Smith et al. |
| 8,887,800 B2 | 11/2014 | Havinga |
| 9,004,203 B2 | 4/2015 | Smith |
| 9,045,178 B2 | 6/2015 | Smith |
| 9,096,282 B2 | 8/2015 | Smith et al. |
| 9,415,819 B2 | 8/2016 | Vogt |
| 9,463,833 B2 | 10/2016 | Smith et al. |
| 9,533,723 B2 | 1/2017 | Smith et al. |
| 9,751,578 B2 | 9/2017 | Smith |
| 9,862,437 B2 | 1/2018 | Smith et al. |
| RE46,723 E | 2/2018 | Smith et al. |
| 9,938,737 B1 | 4/2018 | Garceau |
| 2002/0175319 A1 | 11/2002 | Green |
| 2002/0185319 A1 | 12/2002 | Smith |
| 2004/0211598 A1 | 10/2004 | Palidis |
| 2004/0240973 A1 | 12/2004 | Andrews |
| 2006/0027373 A1 | 2/2006 | Carriere |
| 2006/0213653 A1 | 9/2006 | Cunningham |
| 2009/0000218 A1 | 1/2009 | Lee |
| 2009/0188677 A1 | 7/2009 | Ditta |
| 2009/0200856 A1 | 8/2009 | Chehade |
| 2009/0283324 A1 | 11/2009 | Konduc |
| 2010/0224841 A1 | 9/2010 | Liljedahl |
| 2010/0252395 A1 | 10/2010 | Lehtonen |

(56) References Cited

U.S. PATENT DOCUMENTS

| | | |
|---|---|---|
| 2011/0072737 A1 | 3/2011 | Wasterval |
| 2011/0114386 A1 | 5/2011 | Souchek |
| 2012/0219242 A1 | 8/2012 | Stoik |
| 2013/0153309 A1 | 6/2013 | Smith et al. |
| 2013/0156538 A1 | 6/2013 | Smith et al. |
| 2013/0156539 A1 | 6/2013 | Smith et al. |
| 2013/0240300 A1 | 9/2013 | Fagan |
| 2013/0277124 A1 | 10/2013 | Smith et al. |
| 2014/0014417 A1 | 1/2014 | Smith et al. |
| 2014/0054097 A1 | 2/2014 | Bryant |
| 2014/0158342 A1 | 6/2014 | Smith |
| 2014/0161581 A1 | 6/2014 | Smith et al. |
| 2014/0262562 A1 | 9/2014 | Eldib |
| 2014/0299564 A1 | 10/2014 | Lin |
| 2015/0053426 A1 | 2/2015 | Smith et al. |
| 2015/0125252 A1 | 5/2015 | Berzen |
| 2015/0166134 A1 | 6/2015 | Trevithick |
| 2015/0166313 A1 | 6/2015 | Knapp |
| 2015/0239580 A1 | 8/2015 | Valenzuela |
| 2016/0023647 A1 | 1/2016 | Saunders |
| 2016/0052573 A1 | 2/2016 | Higginbotham, III |
| 2016/0176255 A1 | 6/2016 | Guiboche |
| 2016/0221620 A1 | 8/2016 | Smith |
| 2016/0297488 A1 | 10/2016 | Smith |
| 2017/0021880 A1 | 1/2017 | Smith |
| 2017/0022765 A1 | 1/2017 | Csergei |
| 2017/0101144 A1 | 4/2017 | Higginbotham, II |
| 2017/0327166 A1 | 11/2017 | Smith |
| 2018/0072543 A1 | 3/2018 | Rucker |
| 2018/0183362 A1 | 6/2018 | Jenner |
| 2018/0346041 A1 | 12/2018 | Smith |
| 2019/0016575 A1 | 1/2019 | Unger |
| 2019/0048558 A1 | 2/2019 | Unger |
| 2019/0152704 A1* | 5/2019 | Smith ............... B62D 57/032 |
| 2019/0367111 A1 | 12/2019 | Smith |
| 2020/0207431 A1 | 7/2020 | Higginbotham, III |

FOREIGN PATENT DOCUMENTS

| | | |
|---|---|---|
| CA | 2798790 | 10/2015 |
| CA | 2871406 | 4/2016 |
| CH | 359422 | 1/1962 |
| CN | 1515477 | 7/2004 |
| CN | 101139069 | 3/2008 |
| CN | 102566573 | 12/2013 |
| CN | 105060161 | 11/2015 |
| CN | 105446271 | 3/2016 |
| CN | 106672113 | 5/2017 |
| CN | 107314000 | 11/2017 |
| DE | 2418411 | 10/1975 |
| DE | 4107314 | 9/1992 |
| EP | 469182 | 10/1990 |
| GB | 2315464 | 2/1998 |
| WO | 2004103807 | 12/2004 |
| WO | 2006100166 | 9/2006 |

OTHER PUBLICATIONS

Notice of Pending Litigation Under 37 CFR 1.56 Pursuant to Granted Request for Prioritized Examination Under 37 CFR 1.102€(1), Jun. 28, 2016, 3 pages.

Defendants' First Amended Answer, Affirmative Defenses, and Counterclaims to Plaintiff's Complaint for Patent Infringement, Jun. 27, 2016, p. 9, section 16.

Entro Industries, Inc. brochure "The Future of Rig Walkers", Jun. 2012; 4 pages.

Columbia Industries, LLC brochure "Kodiak Cub Rig Walking System", 2009; 4 pages.

Defendants' Second Amended Answer, Affirmative Defenses, and Counterclaims to Plaintiff's Complain for Patent Infringement, Jul. 12, 2016, p. 9, Sections 15-18.

Defendant Hydraulic System, Inc.'s Preliminary Invalidity Contentions, Nov. 18, 2016, pp. 1-6.

Defendant Hydraulic System, Inc.'s Supplemental Preliminary Invalidity Contentions, May 26, 2017, pp. 1-6.

Colby, Col. Joseph M., "Torsion-Bar Suspension", SAE Quarterly Transactions, vol. 2, No. 2, pp. 195-200, Apr. 1948.

Airstream Inc., "Airstream's New Dura-Torque Axle" Pamphlet, 4 pages.

Schwabe Williamson & Wyatt, PC, "Listing of Related Cases", Feb. 22, 2022, 2 pages.

* cited by examiner

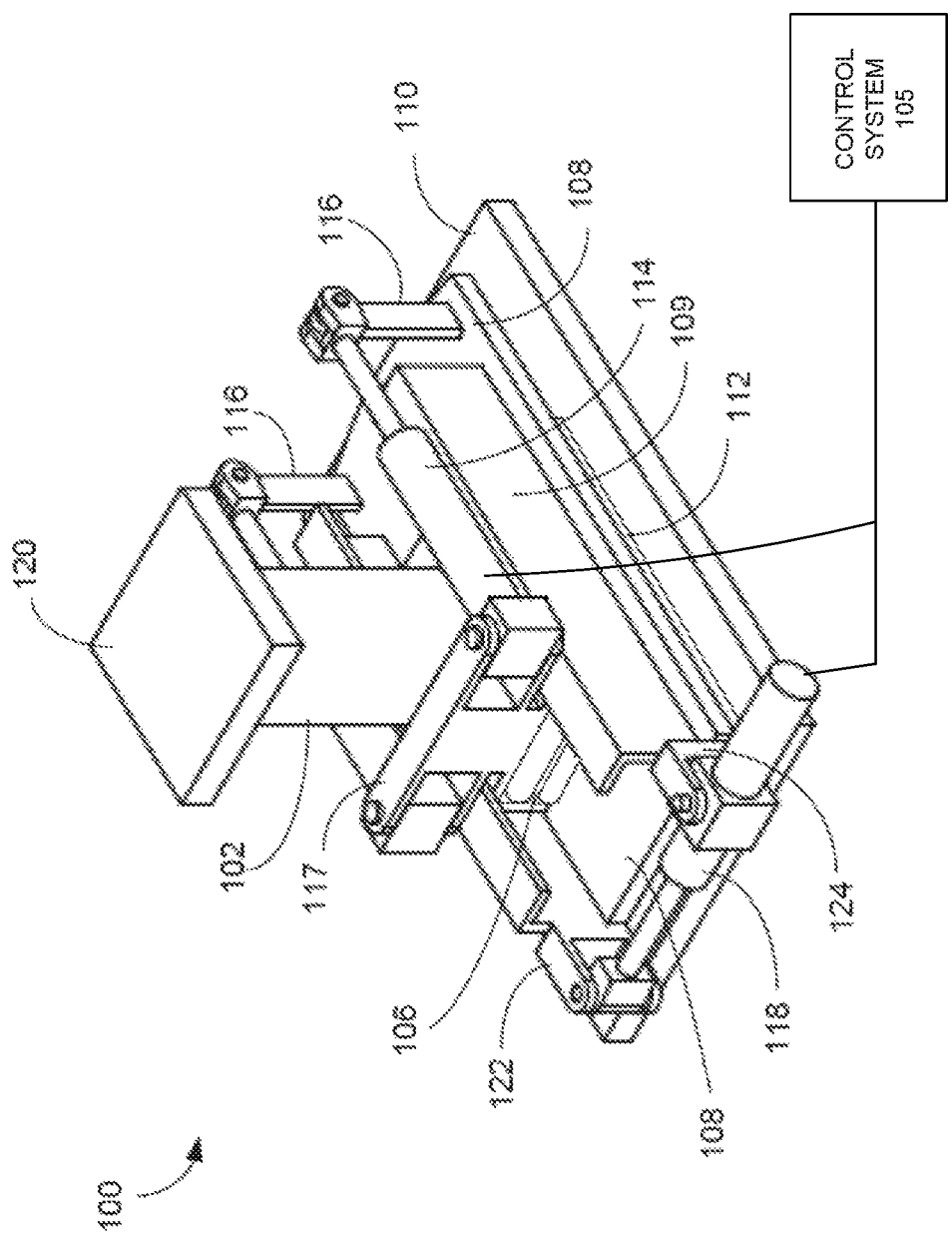

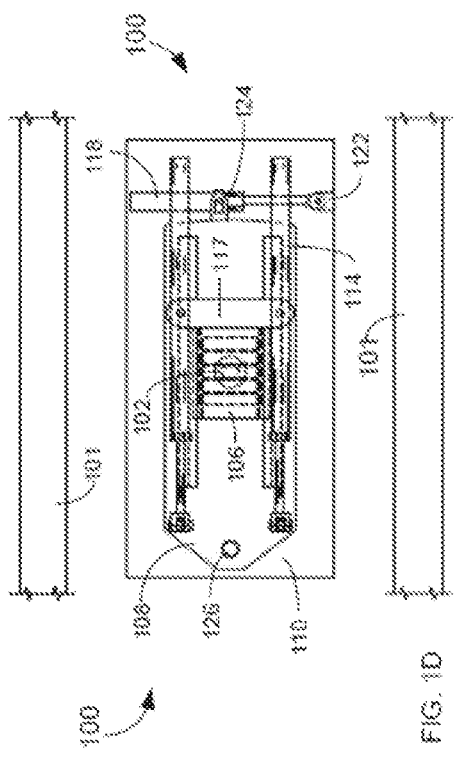
FIG. 1D
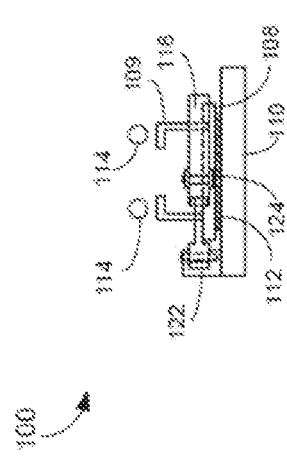
FIG. 1C
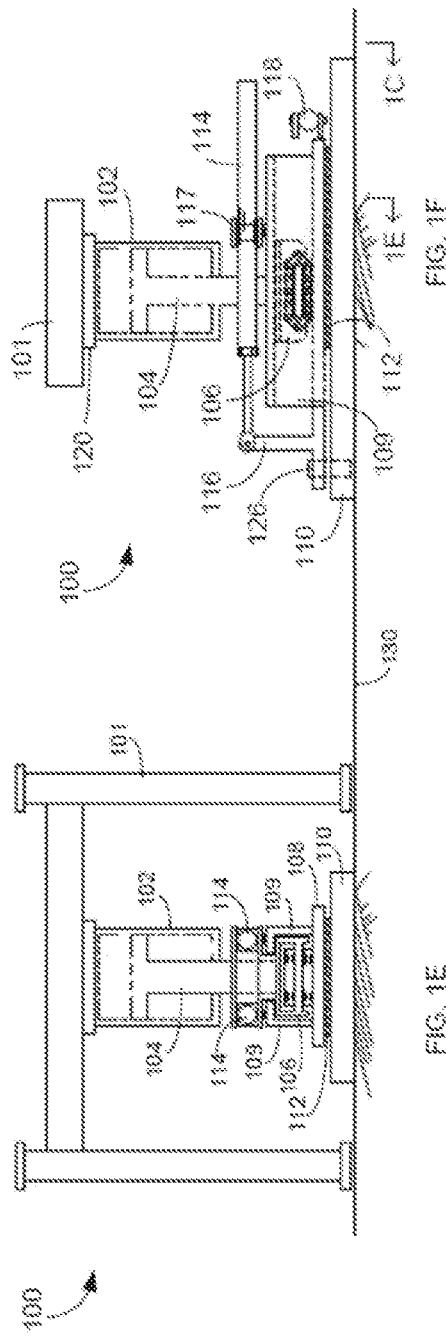
FIG. 1E
FIG. 1F

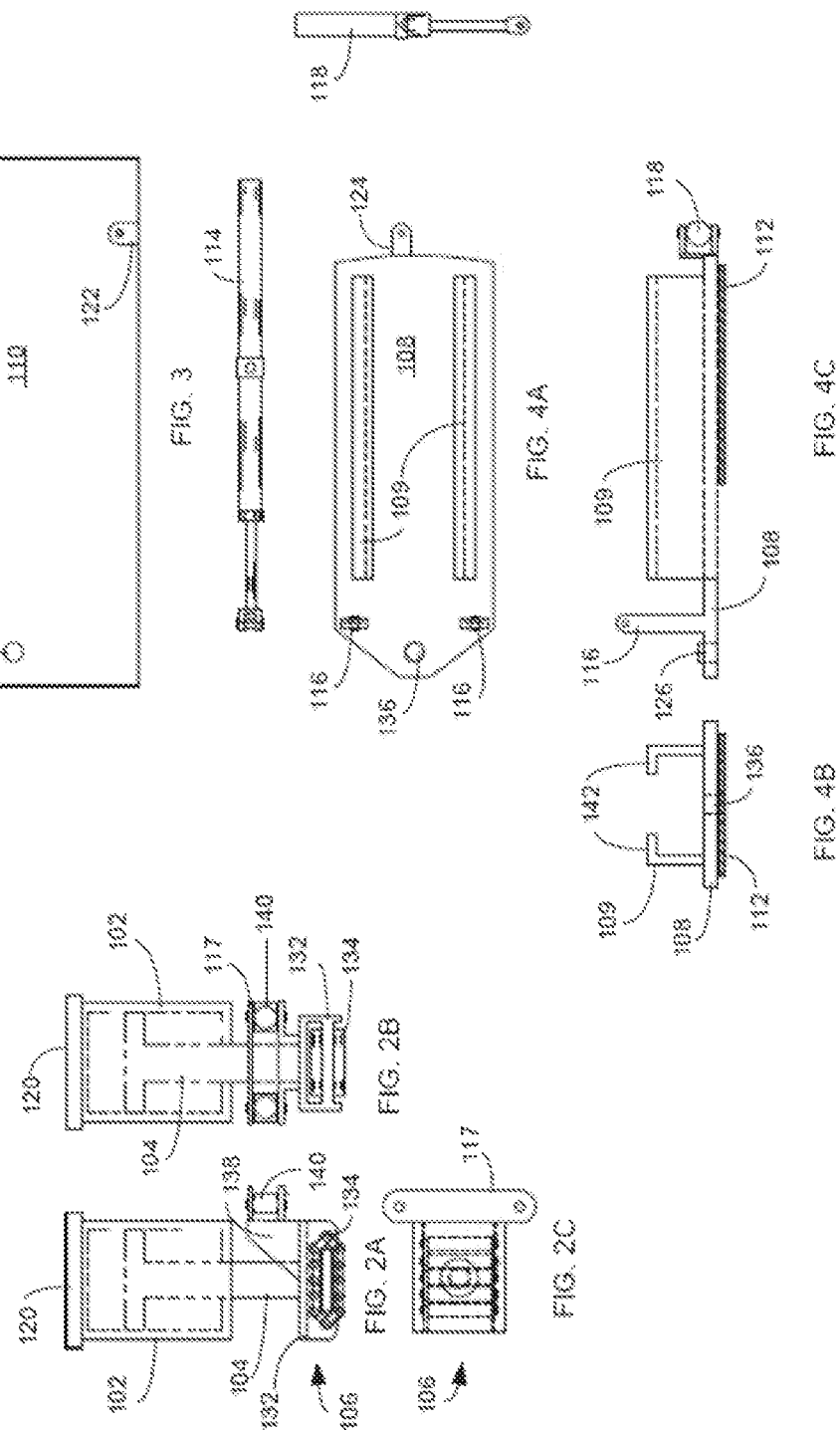

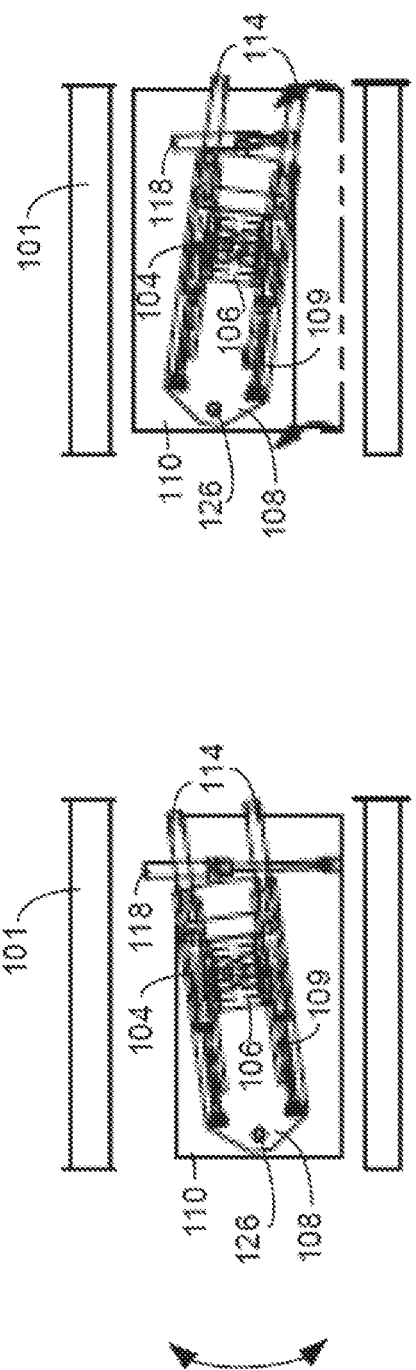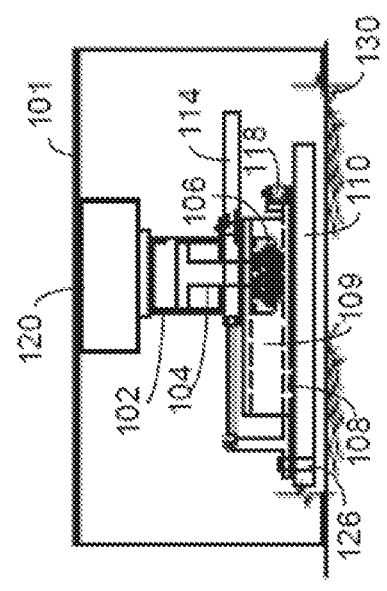
FIG. 9E
FIG. 9D

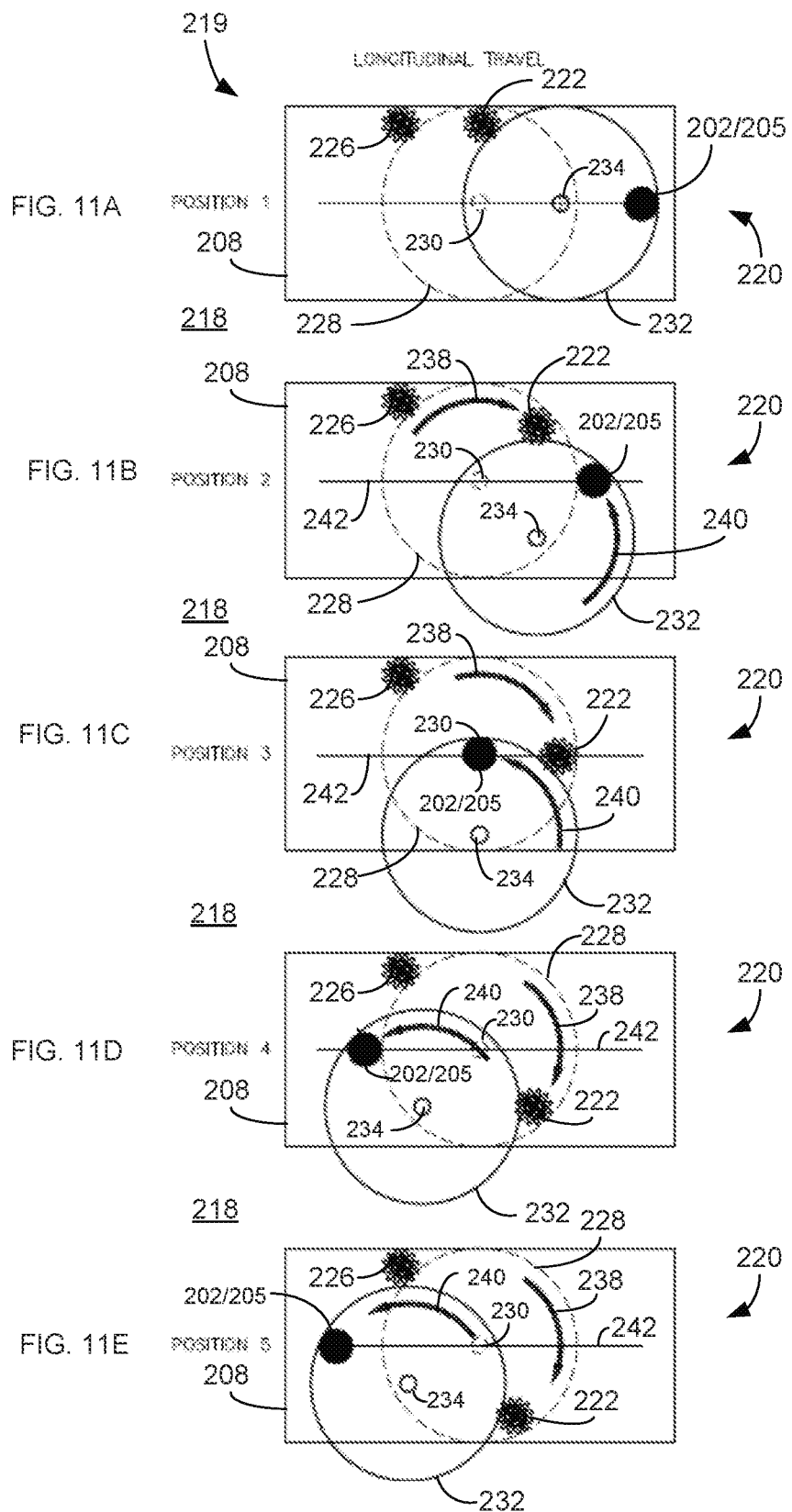

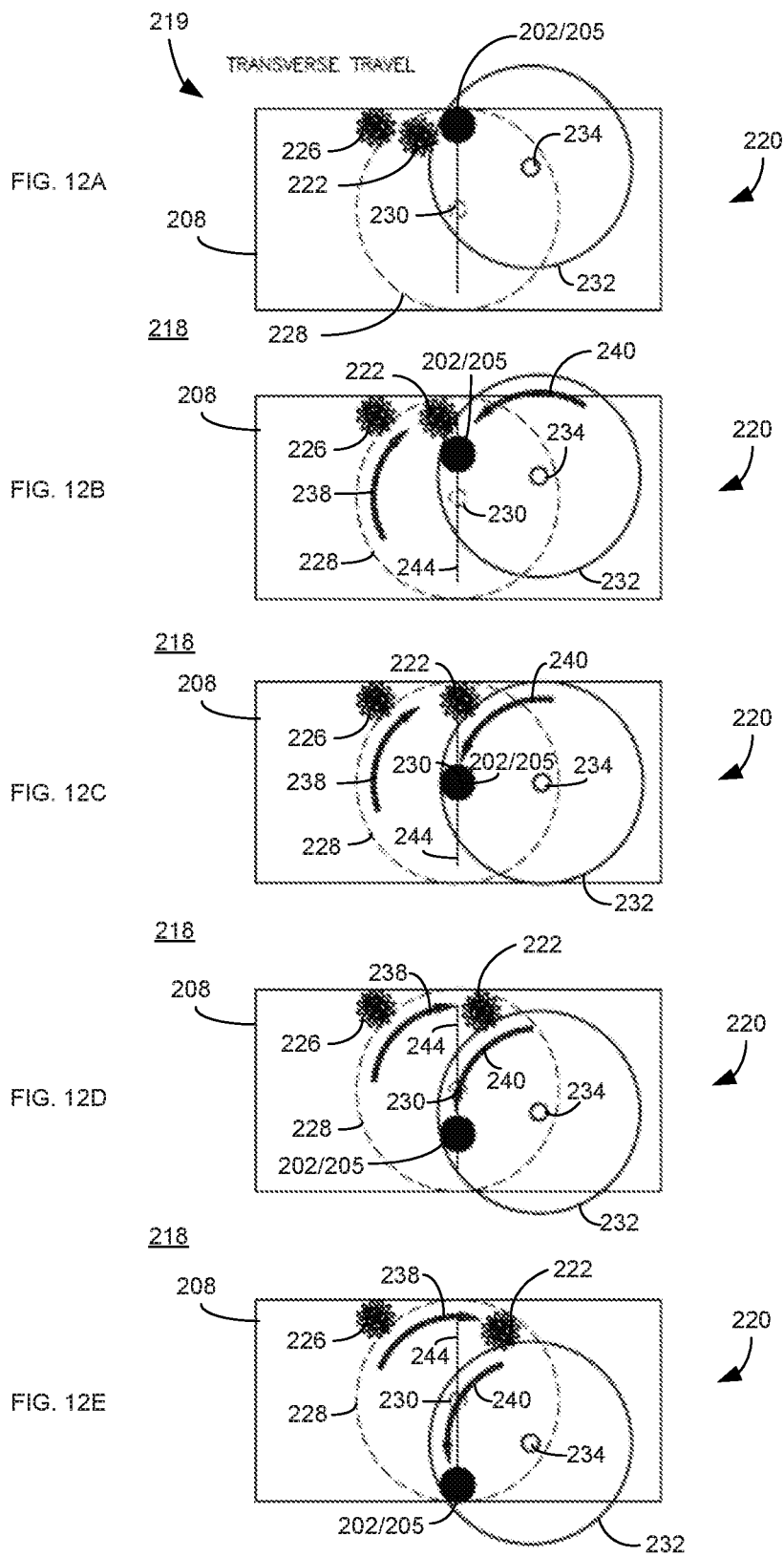

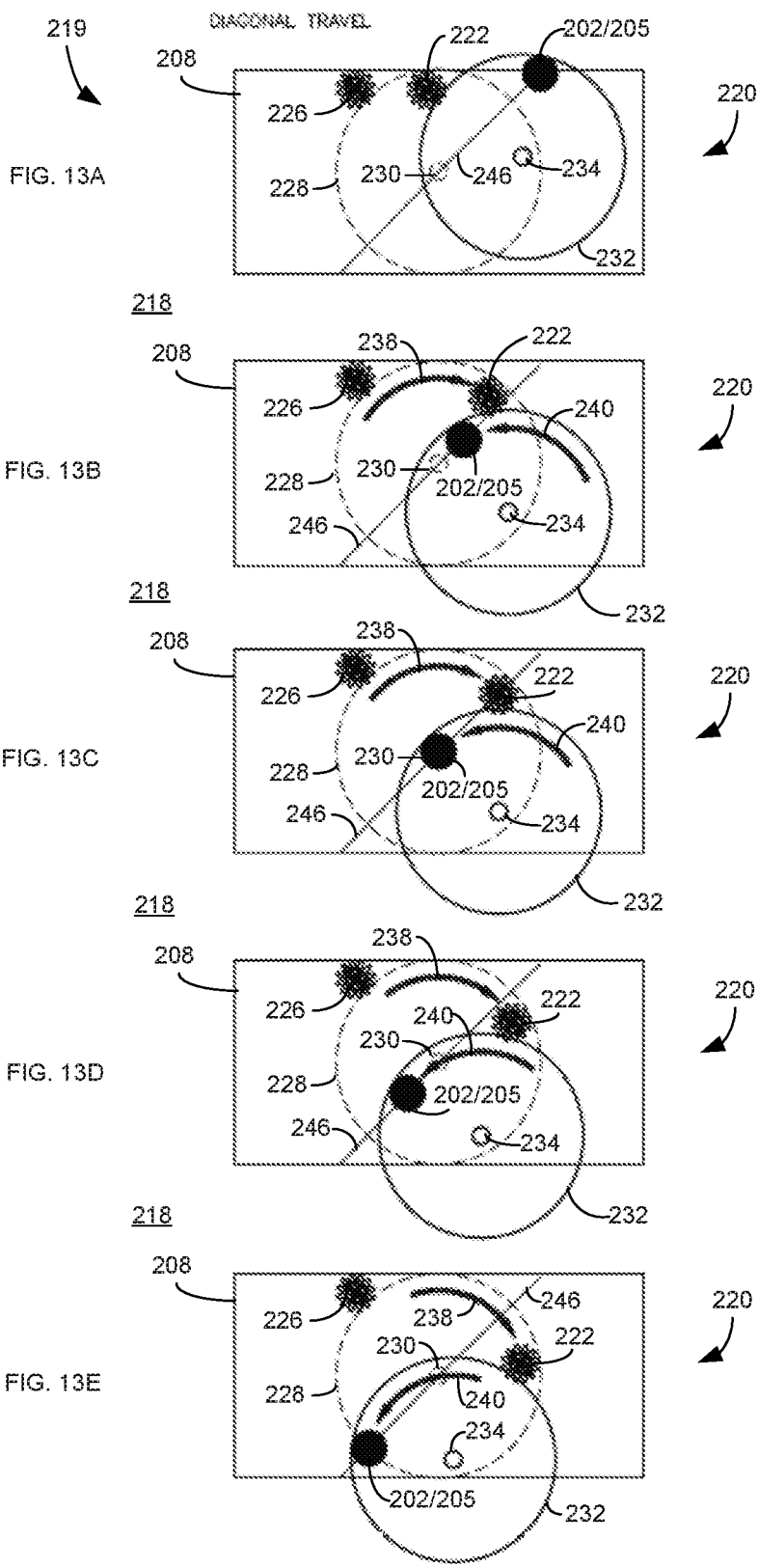

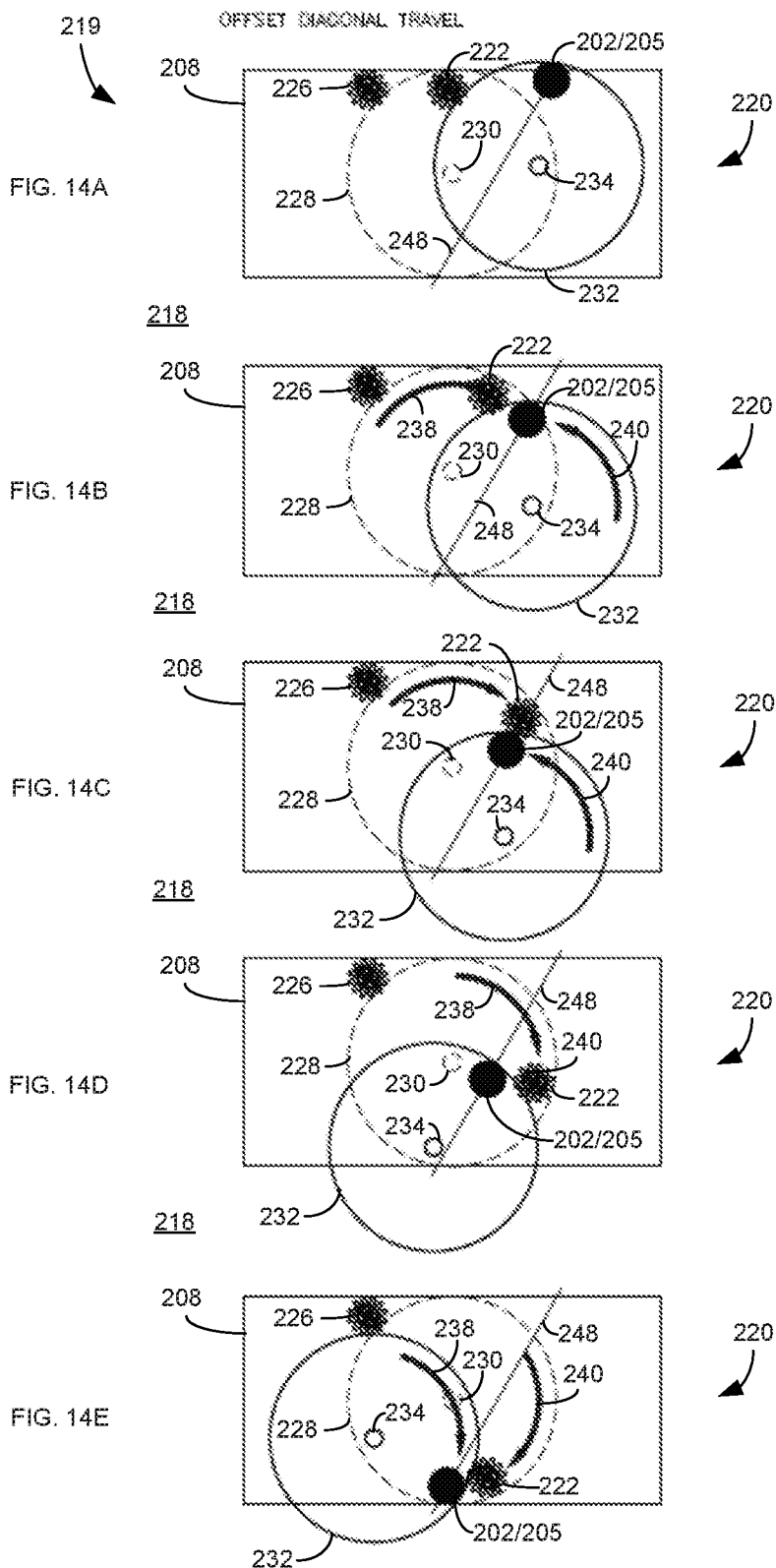

NONLINEAR WALKING APPARATUS

The present application claims priority to U.S. Provisional Patent Application Ser. No. 62/678,872; Entitled: NONLINEAR WALKING APPARATUS; filed May 31, 2018; and U.S. Provisional Patent Application Ser. No. 62/742,691; Entitled: CIRCULAR TRAVEL ASSEMBLY FOR WALKING APPARATUS; filed Oct. 8, 2018 which are both herein incorporated by reference in their entireties.

FIELD OF THE INVENTION

This disclosure relates generally to apparatuses for transporting a load, and more particularly to load transporting apparatuses used to move heavy loads over small distances with the ability to fine tune the resultant position of the heavy load.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only moved a small distance or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled wells in oil fields or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Parker and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area.

However, these walking machines require the load to be lowered onto the base surface in order to change the direction of horizontal motion.

BRIEF DESCRIPTION OF THE DRAWINGS

FIG. 1A shows a front perspective view of a walking apparatus.

FIG. 1C shows an isolated end view of the walking apparatus of FIG. 1A.

FIG. 1D shows a plan view of the walking apparatus of FIG. 1A.

FIG. 1E shows a sectional end view of the walking apparatus of FIG. 1A.

FIG. 1F shows a side view of the walking apparatus of FIG. 1A.

FIG. 2A shows a side view of a roller assembly used with the walking apparatus of FIG. 1A.

FIG. 2B shows an end view of the roller assembly shown in FIG. 2A.

FIG. 2C shows a plan view of the roller assembly shown in FIG. 2A.

FIG. 3 shows a plan view of a support foot used with the walking apparatus of FIG. 1A.

FIG. 4A shows a plan view of a middle frame and cylinders used with the walking apparatus of FIG. 1A.

FIG. 4B shows an end view of the middle frame shown in FIG. 4A.

FIG. 4C shows a side view of the middle frame shown in FIG. 4A.

FIGS. 9A-9E show further examples of the non-linear rotational or circular stepping operations for the walking apparatus of FIG. 1A.

FIGS. 11A, 11B, 11C, 11D, and 11E show different longitudinal walking stages of the dual bull gear walking apparatus of FIG. 10A.

FIGS. 12A, 12B, 12C, 12D, and 12E show different transverse walking stages of the dual bull gear walking apparatus of FIG. 10A.

FIGS. 13A, 13B, 13C, 13D, and 13E show different diagonal walking stages of the dual bull gear walking apparatus of FIG. 10A.

FIGS. 14A, 14B, 14C, 14D, and 14E show different offset diagonal walking stages of the dual bull gear walking apparatus of FIG. 10A.

DETAILED DESCRIPTION

As described above, walkers, or walking machines, are vehicles that transport heavy loads, such as entire oil well drilling rigs. Such loads weigh as much as several thousand tons and may be required to be sequentially positioned very precisely over spaced-apart well bores, for example. Embodiments of the present concept are directed to controlling walking apparatuses, such as walking machines, for moving heavy loads over small distances with the ability to fine tune the resultant position of the heavy load.

For ease of understanding, the terms, "walkers," "walking machines," "walking devices," and "walking apparatuses" are used interchangeably below. Walking apparatus or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1B:
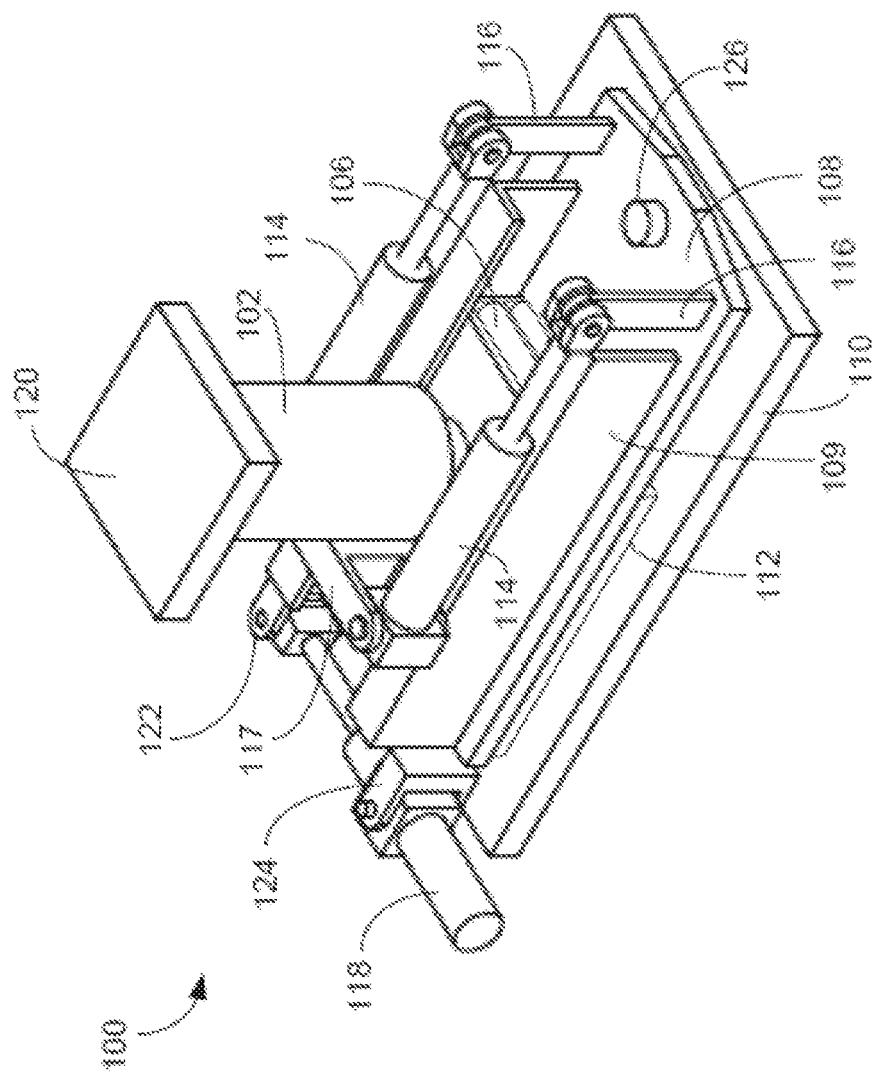
FIG. 1B shows a rear perspective view of the walking apparatus of FIG. 1A.

FIGS. 1A-1F show a walking apparatus 100 that includes a unique non-linear or circular traveling system. FIG. 1A is a front perspective view of walking apparatus 100, FIG. 1B is a rear perspective view of walking apparatus 100, FIG. 1C is an end view of walking apparatus 100, FIG. 1D is a plan view of walking apparatus 100, FIG. 1E is an end section view of walking apparatus 100, and FIG. 1F is a side view of walking apparatus 100.

Referring to FIGS. 1A-1F, walking apparatus 100 includes a lift cylinder 102 that attaches at a top end via a mounting plate 120 to a load or a load bearing frame 101. A lift rod 104 extends down out of lift cylinder 102 and is attached at a bottom end to a roller assembly 106. A middle frame 108 is located underneath the bottom of roller assembly 106 and includes two rails 109 that extend up from opposite sides to retain roller assembly 106.

An anti-friction pad 112 may be located between the bottom of middle frame 108 and a top surface of a support foot 110. In one example, anti-friction pad 112 may extend underneath substantially the entire lateral surface of middle frame 108. Anti-friction pad 112 may be made out of a hard plastic but can be any material that reduces the friction between middle frame 108 and support foot 110. In another example, no anti-friction pad is used and middle frame 108 rotates directly over the lubricated top surface of support foot 110

Two travel cylinders 114 attach at first ends to mounting arms 116 that extend vertically up from the back end of middle frame 108 and attach at second opposite ends in between t-shaped arms 117 that extend up and out from the front end of roller assembly 106. A rotation cylinder 118 attaches at a first end to a mounting post 122 that extends vertically up from the front end of support foot 110 and attaches at a second opposite end to a hinge 124 that extends out from the front end of middle frame 108. A pin connector 126 extends up from the back end of support foot 110 and is rotationally coupled to the back end of middle frame 108.

A control system 105 may include electrical and hydraulic equipment used to control walking apparatus 100 based on inputs from sensors located on walking apparatus 100 and based on control signals from a remote-control device (not shown). Electrical and hydraulic control lines may send control information and hydraulic pressure and flow to lifting cylinder 102, travel cylinders 114, and rotation cylinder 118. Control system 105 is configured to operate the first travel mechanism comprising middle frame 108 and rotation cylinder 118 and the second travel mechanism comprising roller assembly 106 and travel cylinders 114 separately or simultaneously to move the lift mechanism along a selectable horizontal path.

FIG. 2A is an isolated side sectional view of roller assembly 106, FIG. 2B is an isolated end view of roller assembly 106, and FIG. 2C is an isolated plan view of roller assembly 106 sectioned through lift rod 104. Referring to FIGS. 2A-2C, lift rod 104 moves vertically up and down inside of lift cylinder 102 and is coupled at a bottom end to roller assembly 106. Roller assembly 106 may include a roller frame 132 that retains a set of rollers 134 that rotate about a middle section of roller frame 132.

A pair of support members 138 extend up from opposite front top sides of roller frame 132. Arms 117 extend laterally out from support members 138 and retain hinges 140 that attach to the front ends of travel cylinders 114. Example roller assemblies are described in U.S. Pat. No. 8,573,334 which is herein incorporated by reference in its entirety.

FIG. 3 shows an isolated top plan view of support foot 110. In one example, support foot 110 is substantially rectangular piece of metal and includes a cylindrical pin connector 126 that extends vertically up. Mounting post 122 extends up from a front side of support foot 110 and retains rotation cylinder 118.

FIG. 4A is a plan view of middle frame 108, FIG. 4B is an end view of middle frame 108, and FIG. 4C is a side view of middle frame 108. Referring to FIGS. 4A-4C, middle frame includes a trapezoid shaped back end that includes a hole 136 for rotationally receiving cylindrical shaped pin connector 126. Two arms 116 extend up from opposite sides on the back end of middle frame 108 and attach to the back ends of travel cylinders 114.

Rails 109 extend up lengthwise along opposite lateral sides of middle frame 108 and include inwardly facing arms 142 that hold roller assembly 106 down against middle frame 108. Hinge 124 extends out and up from a curved front end of middle frame 108 and retains rotation cylinder 118. Anti-friction pad 112 is attached to the bottom front end of middle frame 108. Pad 112 extends over substantially the entire width from the front end to beyond a middle of middle frame 108.

Referring to FIGS. 1A-1F, 2A-2C, 3, and 4A-4C, walking apparatus 100 uses a unique rotating middle frame 108 to move lift mechanism 102 and an attached load in a non-linear path, such as along a curved or arc path. Walking apparatus 100 effectively moves lift mechanism 102 and the load along polar coordinates that include an angular and radial displacement. Lift cylinder 102 extends lift rod 104 pressing support foot 110 into a base surface and raising a load off of the base surface. Rotation cylinder 118 extends and retracts to then rotate middle frame 108, roller assembly 106, lift rod 104, and load bearing frame 101 about pin connector 126 that extends up from support foot 110.

Travel cylinders 114 and rotation cylinder 118 may operate at the same time, or at different times, to rotate and move roller assembly 106, lift rod 104, and move load bearing frame 101 forward or backwards horizontally in any selectable straight, diagonal, curved, or non-linear path.

Figure 5A:
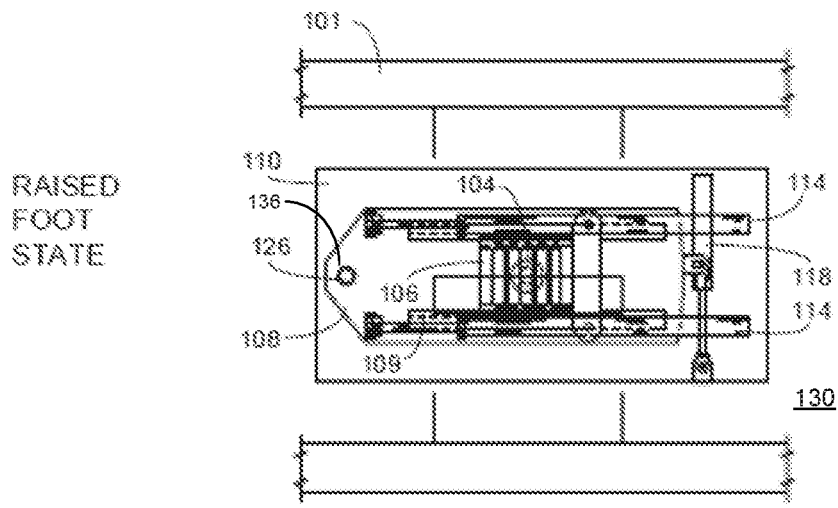
FIGS. 5A-5C show straight stepping operations for the walking apparatus of FIG. 1A while the support foot is in a raised position.
Figure 5B:
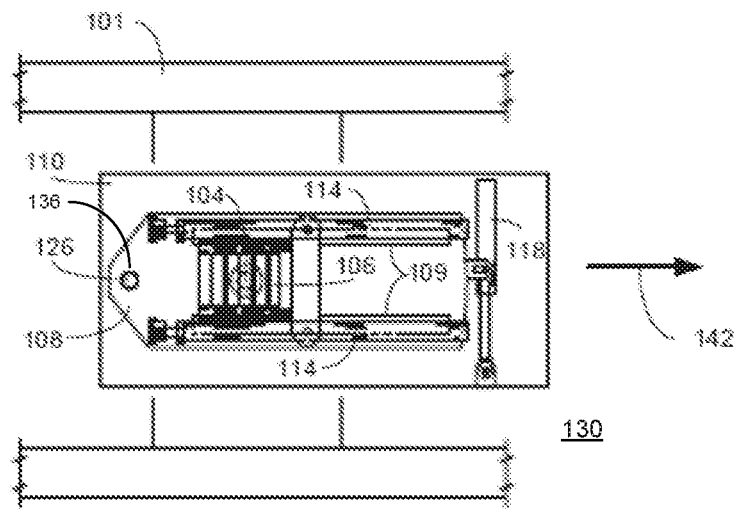
Figure 5C:
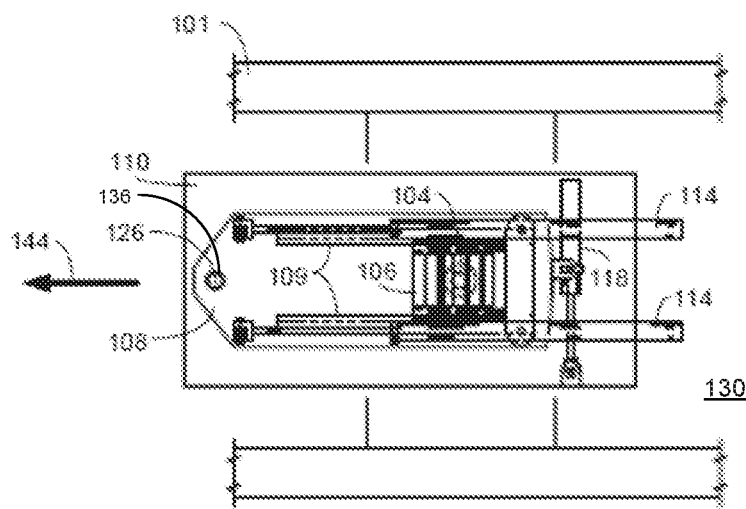

FIGS. 5A-5C are top plan views showing an example of how support foot 110 is moved in a straight travel direction relative to a load supported by a load bearing frame 101. In the explanations below, it is assumed that a load bearing frame 101 may also be supporting a load, such as an oil platform.

As explained above, a top end of a lift cylinder 102 is attached to load bearing frame 101 and a bottom end of lift rod 104 is attached to the top of roller assembly 106. Lift cylinder 102 and lift rod 104 that lift load bearing frame 101 off and onto a base surface 130 are referred to generally as a lift mechanism. In a raised foot state, lift rod 104 is retracted partially into lift cylinder 102 lowering load bearing frame 101 onto base surface 130 and raising support foot 110 off of base surface 130.

FIG. 5A shows support foot 110 in a middle position where travel cylinders 114 are partially extended holding middle frame 108 and support foot 110 in substantially a middle longitudinal position relative to roller assembly 106 and lift rod 104. Rotation cylinder 118 is also partially extended also holding the longitudinal axis of middle frame 108 in a substantially parallel alignment with the longitudinal axes of support foot 110 and load bearing frame 101.

FIG. 5B shows support foot 110 in a forward extended position where travel cylinders 114 are fully retracted. Load bearing frame 101 is sitting on the ground also holding lift rod 104 and roller assembly 106 in a stationary position. Retracting travel cylinders 114 pulls middle frame 108 forward causing hole 136 in the back end of middle frame 108 to pull on pin connector 126. Rails 109 and the top surface of middle frame 108 move forward underneath and around stationary roller assembly 106 moving attached support foot 110 in a straight-line forward direction 142 relative to stationary lift mechanism load bearing 102/104 and attached frame 101.

FIG. 5C shows support foot 110 in a rearward extended position where travel cylinders 114 are fully extended. Load bearing frame 101 is still pressing on base surface 130 holding lift rod 104 and roller assembly 106 in a stationary position. Extending travel cylinders 114 pushes middle frame 108 backwards. The top surface and rails 109 of middle frame 108 slide backwards underneath and around roller assembly 106 causing hole 136 in the back end of middle frame 108 to push on pin connector 126 and move support foot 110 in a straight linear backwards direction 144 relative to load bearing frame 101.

Figure 6A:
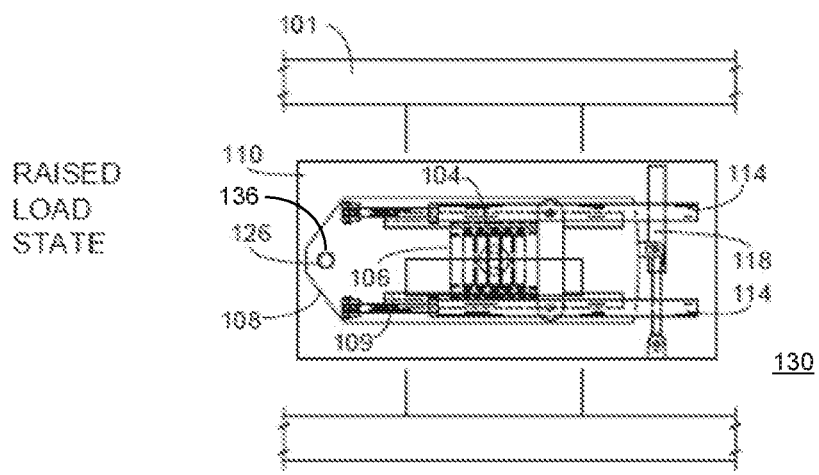
FIGS. 6A-6C show straight stepping operations for the walking apparatus of FIG. 1A while the support foot is lowered onto the ground.
Figure 6B:
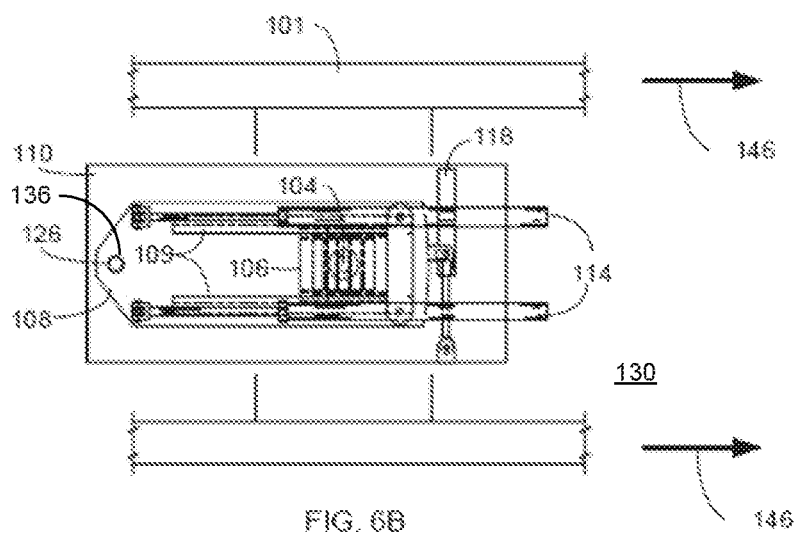
Figure 6C:
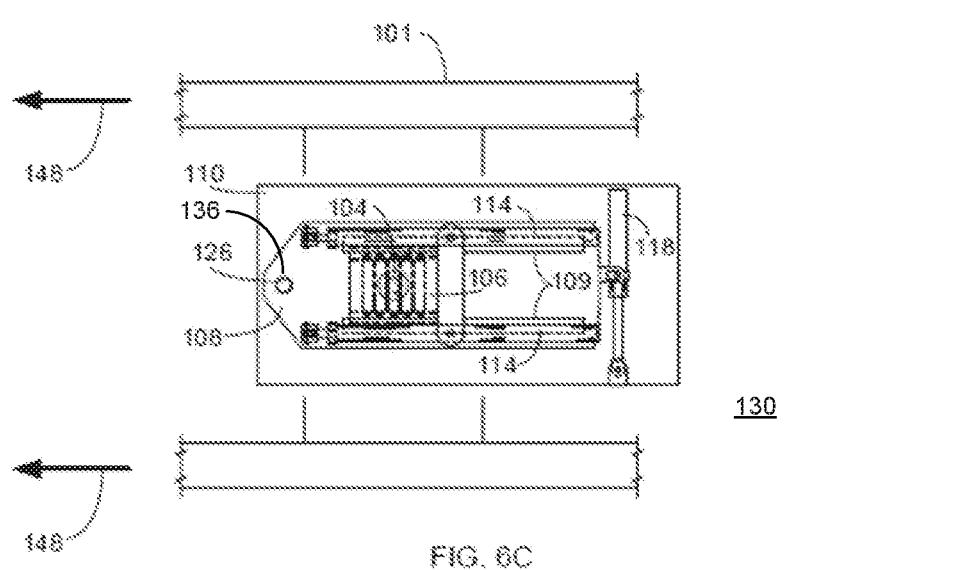

FIGS. 6A-6C are top plan views showing an example of how load bearing frame 101 is moved in a straight travel direction relative to support foot 110. As explained above, a lift mechanism that includes a top end of a lift cylinder 102 is attached to load bearing frame 101 and a bottom end of lift rod 104 is attached to the top of roller assembly 106. In a raised load state, lift rod 104 is extended partially out of lift cylinder 102 lowering support foot 110 onto base surface 130 and raising load bearing frame 101 off of base surface 130.

FIG. 6A shows support foot 110 in the middle position where travel cylinders 114 are partially extended holding roller assembly 106 and lift rod 104 in substantially a center position of middle frame 108 and support foot 110. Rotation cylinder 118 is also partially extended also holding the longitudinal axes of middle frame 108 in a substantially parallel alignment with support foot 110 and load bearing frame 101.

FIG. 6B shows load bearing frame 101 in a forward extended position where travel cylinders 114 are fully extended. Support foot 110 is pressing against base surface 130 holding middle frame 108 with pin connector 126. Extending travel cylinders 114 pushes roller assembly 106 against anchored pin connector 126 and middle plate 126. Roller assembly 106 moves forward inside of rails 109 moving attached lift rod 104 and load bearing frame 101 in a linear forward direction 146 relative to support foot 110.

FIG. 6C shows load bearing frame 101 in a rearward extended position where travel cylinders 114 are fully retracted. Support foot 110 is still pressing against the base surface holding middle frame 108 with pin connector 126. Retracting travel cylinders 114 pulls roller assembly 106 against anchored pin connector 126 and middle plate 108. Roller assembly 106 moves backwards inside of rails 109 moving attached lift rod 104 and load bearing frame 101 in backward direction 148 relative to stationary support foot 110.

Figure 7A:
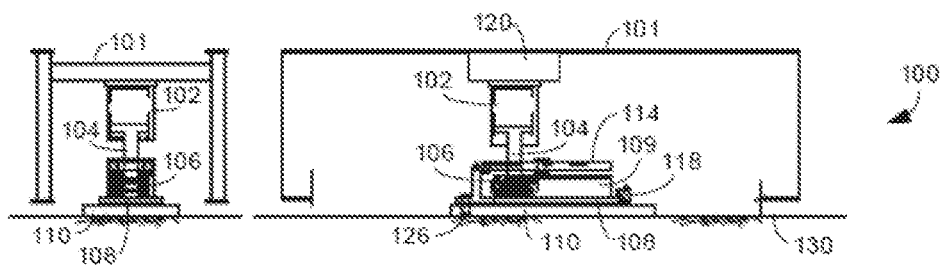
FIGS. 7A-7D show further examples of straight stepping operations for the walking apparatus of FIG. 1A.

FIGS. 7A-7D show a straight walking cycle for walking apparatus 100. The left side drawings are end views of walking apparatus 100 and the right-side drawings are side views of walking apparatus 100. FIG. 7A shows a first phase of the step operation where walking apparatus 100 is in the intermediate state shown in FIG. 6A. Lift cylinder 102 extends lift rod 104 vertically down pressing support foot 110 against base surface 130 and lifting load bearing frame 101 off of base surface 130. Any load on load bearing frame 101 is now supported by support foot 110.

Figure 7B:
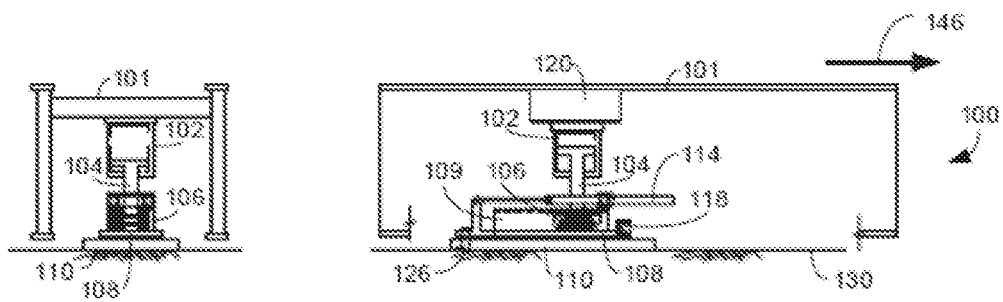

FIG. 7B shows a second phase of the step operation where travel cylinders 114 are extended. Support foot 110 is secured to base surface 130 by the load on load bearing frame 101. The back ends of travel cylinders 114 are attached to middle frame 108 that is anchored to support foot 110 by pin connector 126. Accordingly, extending travel cylinders 114 moves roller assembly 106 forward between rails 109 on top of middle frame 108. Roller assembly 106 moves the lift mechanism (lift cylinder 102 and lift rod 104) and attached load bearing frame 101 in forward direction 146 relative to stationary support foot 110 and base surface 130.

Figure 7C:
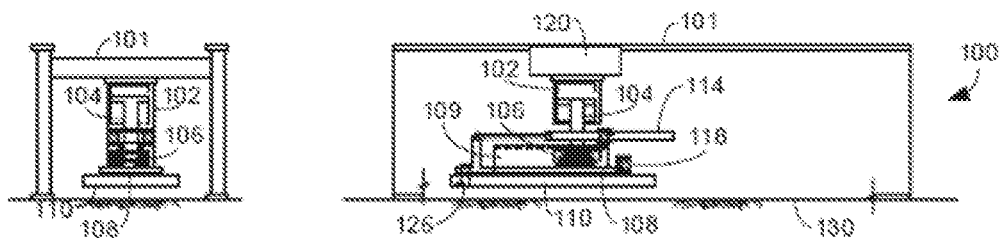

FIG. 7C shows a third phase of the step operation where lift cylinder 102 retracts lift rod 104 lowering load bearing frame 101 down onto base surface 130 and lifting support foot 110 up off of base surface 130.

Figure 7D:
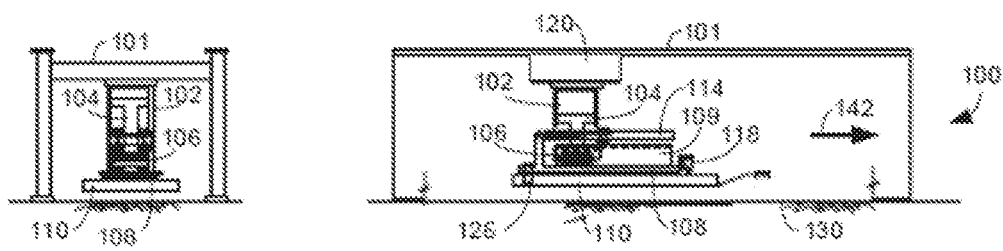

FIG. 7D shows a fourth phase of the step operation where travel cylinders 114 are retracted while support foot 110 is raised off of base surface 130. Lift rod 104 and attached roller assembly 106 are now held in place by the weight of load bearing frame 101. As shown above in FIG. 5B, retracting travel cylinders 114 pulls middle frame 108 forward causing hole 136 (FIG. 4A) in the back end of middle frame 108 to pull on pin connector 126. Support foot 110 no longer presses against base surface 130. Accordingly, middle frame 108 pulls support foot 110 underneath stationary roller assembly 106 in forward direction 142 relative to lift cylinder 102, lift rod 104, load bearing frame 101 and base surface 130.

Figure 8A:
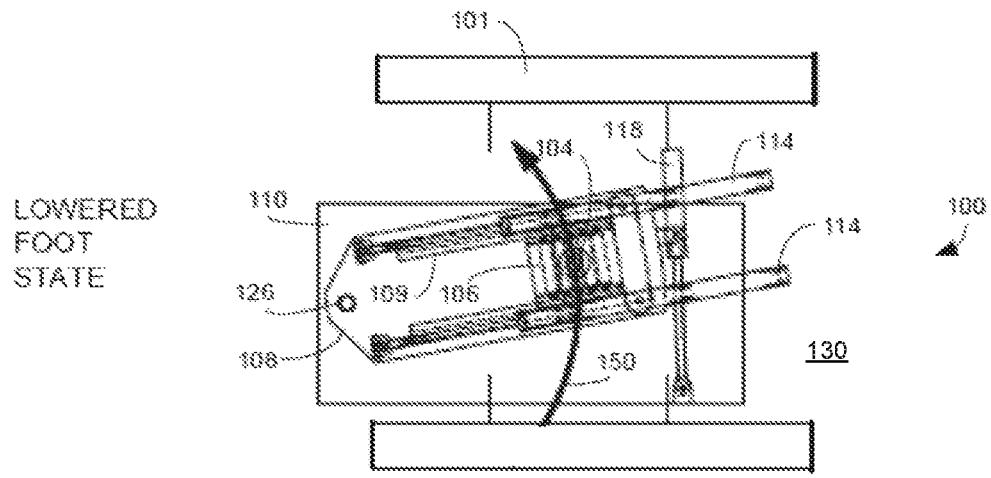
FIGS. 8A-8C show a non-linear rotational or circular stepping operations for the walking apparatus of FIG. 1A.
Figure 8B:
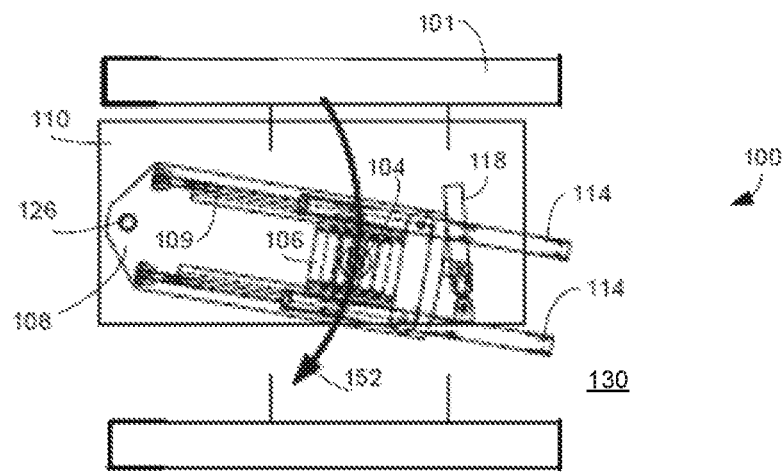
Figure 8C:
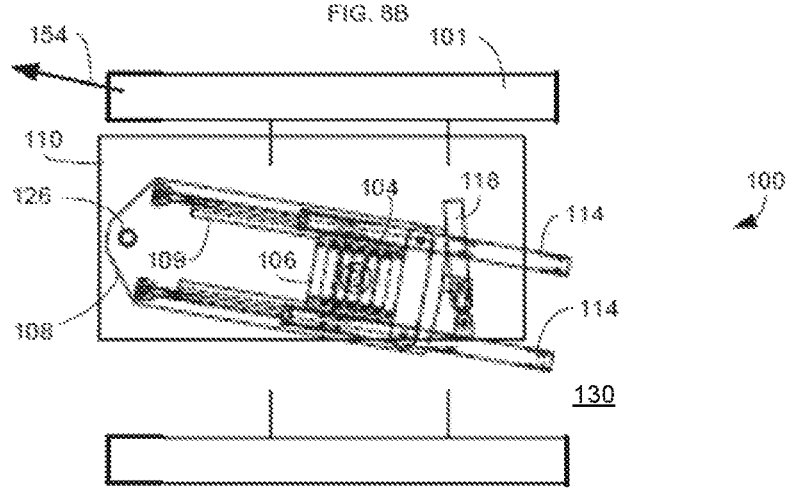

FIGS. 8A-8C are top plan views showing an example of how walking apparatus 100 displaces load bearing frame 101 in a non-linear direction relative to support foot 110, such as in a curved or arc path. As explained above, walking apparatus 100 may move load bearing frame 101 along polar coordinates that include an angular and radial displacement. FIGS. 8A-8C show the lowered support foot state where lift rod 104 is extended out of lift cylinder 102 lowering support foot 110 onto the base surface 130 and raising load bearing frame 101 off of base surface 130.

FIG. 8A shows load bearing frame 101 in far-left position where rotation cylinder 118 is fully extended. Support foot 110 is pressed against base surface 130 holding the back end of middle frame 108 with pin connector 126. However, middle frame 108 can also rotate about pin connector 126 and includes bottom anti-friction pad 112 (FIGS. 1 and 4) that further promotes the nonlinear rotation of middle frame 108 over the top surface of support foot 110. As explained above, in another example, middle frame 108 may rotate directly over the top surface of support foot 110. Lift rod 104 also may rotate within lift cylinder 102. In another example, bearings may be located between the top of roller assembly 106 and the bottom of lift rod 104 allowing lift rod 104 to rotate about the top surface of roller assembly 106.

Extending rotation cylinder 118 rotates middle frame 108 in a counter clockwise direction 150 about pin connector 126. Rails 109 extending up from middle frame 108 move and rotate roller assembly 106 and lift rod 104 and move load bearing frame 101 in a non-linear path, such as in a curved or arc shaped path.

The radius of arc 150 varies based on the amount travel cylinders 114 are extended. For example, extending travel cylinders 114 increases the distance a given extension of rotation cylinder 118 moves load bearing frame 101 along a selectable radius of arc 150. Thus, the length of travel along arc 150 is dependent upon a radial position of roller assembly 106 controlled by travel cylinders 114. Lift rod 104 rotates within lift cylinder 102 as rotation cylinder 118 rotates middle frame 108 and roller assembly 106 about pin connector 126. This allows the longitudinal axis of load bearing frame 101 to remain substantially parallel with the longitudinal axis of support foot 110 while load bearing frame 101 moves along the non-linear path of arc 150.

FIG. 8B shows load bearing frame 101 moving from the far-left rotational position in FIG. 8A to a far-right rotational position. Support foot 110 still pressing against the base surface and lifting load bearing frame 101 off of the base surface. Rotation cylinder 118 is retracted rotating middle frame 108 in a clockwise direction 152 around anchored pin connector 126. Rails 109 also move lift rod 104 and load bearing frame 101 in a non-linear path 152.

FIG. 8C shows how walking apparatus 100 moves load bearing frame 101 in a diagonal direction 154. For example, after retracting rotation cylinder 118, middle frame 108 is aligned in a diagonal direction 154 relative to the longitudinal axes of support foot 110 and load bearing frame 101. Holding rotation cylinder 118 in the retracted position of FIG. 8C anchors both ends of middle frame 108 to support foot 110. Retracting travel cylinders 114 moves roller assembly 106 in diagonal direction 154 between stationary rails 109. In turn, roller assembly 106 moves lift rod 104 and attached load bearing frame 101 in the same diagonal direction 154.

It should be noted that travel cylinders 114 and rotation cylinder 118 can move load bearing frame 101 at the same time along any selectable path created by the nonlinear movement 152 created by the rotation of middle frame 108 and the linear movement 154 created by the linear movement of roller assembly 106 within middle frame 108.

Figure 9C:
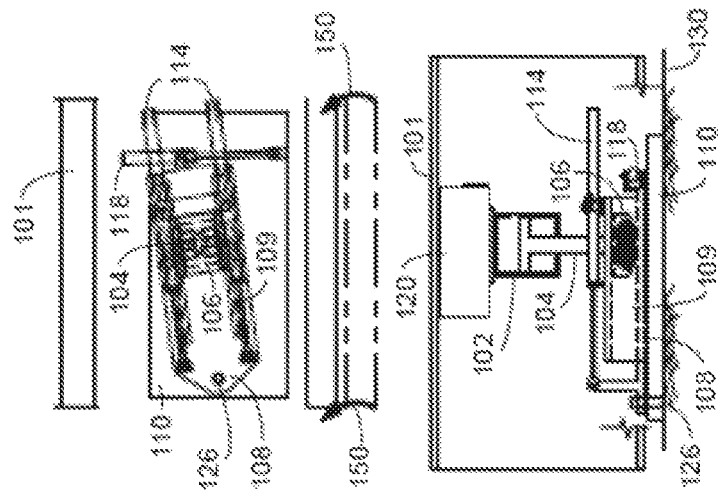
Figure 9B:
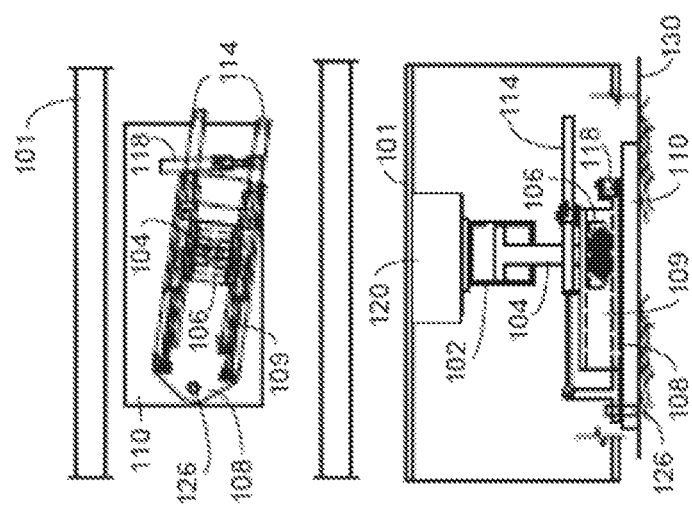
Figure 9A:
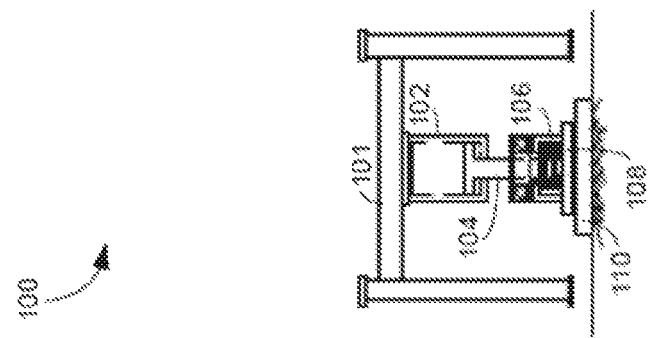

FIGS. 9A-9E show in more detail a walking operation where walking apparatus 100 moves load bearing frame 101 along a non-linear path, such as an arc. FIG. 9A is an end view of walking apparatus 100. In an initial lifted state, lift cylinder 102 extends lift rod 104 to lower support foot 110 onto base surface 130 and raise load bearing frame 101 off of base surface 130.

FIGS. 9B-9E each includes a top plan view and a bottom side view of walking apparatus 100. FIG. 9B shows walking apparatus 100 holding load bearing frame 101 above base surface 130 as also shown in FIG. 9A. Rotation cylinder 118 is fully retracted rotating middle frame 108 clockwise and translating load bearing frame 101 along a curved path into a far-right position relative to support foot 110.

FIG. 9C shows walking apparatus 100 still holding load bearing frame 101 above base surface 130. Rotation cylinder 118 is extended rotating middle frame 108 and in a counter clockwise direction 150 about pin connector 126 and translating load bearing frame 101 along a curved path into far-left positions relative to support foot 110.

FIG. 9D shows lift rod 104 partially retracted up into lift cylinder 102 lowering load bearing frame 101 back onto base surface 130 and lifting support foot 110 off of base surface 130. Support foot 110 no longer presses against base surface 130. Lift rod 104 and attached roller assembly 106 are rotationally coupled to load bearing frame 101 which now presses against base surface 130.

Extending rotation cylinder 118 moves support foot 110 and attached pin connector 126 to the right relative to load bearing frame 101. Pin connector 126 in turn rotates middle frame 108 in a counter clockwise direction around lift rod 104. This causes support foot 110 and the back end of middle frame 108 to translate along a curved path toward the right side of load bearing frame 101.

Walking apparatus 100 also may include a yaw control device that maintains a substantially parallel alignment between the longitudinal axes of load bearing frame 101 and support foot 110 both when moving support foot 110 with rotation cylinder 118 while in the raised position and when a non-parallel displacement is created between load bearing frame 101 and support foot 110 during a stepping operation. Yaw control devices are described in U.S. Pat. Nos. 9,463,833; 8,561,733; and U.S. patent application Ser. No. 15/886,646 which are both incorporated by reference in their entireties.

FIG. 9E still shows load bearing frame 101 pressing against base surface 130 and support foot 110 raised off of base surface 130. Retracting rotation cylinder 118 moves support foot 110 in a non-linear curved or arc shaped path to the left side of load bearing frame 101. Rotation cylinder 118 pulls the right front side of support foot 110 toward the front end of middle frame 108. Middle frame 108 rotates in a clockwise direction around lift rod 104 also moving pin connector 126 to the left in a non-linear curved or arc-shaped direction. Pin connector 126 in turn moves support foot 110 in a non-linear path toward the left side of load bearing frame 101.

Some movements of load bearing frame 101 produced by travel cylinders 114 and rotation cylinder 118 have been shown separately. It should be understood that travel cylinders 114 and rotation cylinder 118 may be extended and/or retracted at the same time to move load bearing frame in any rotational, radial, diagonal, or straight direction. For example, rotation cylinder 118 and travel cylinders 114 may move load bearing frame 101 in any selectable linear, nonlinear, angular, and/or radial polar coordinate direction relative to support foot 110.

To summarize, a load transporting apparatus is configured to move a load bearing frame carrying a load over a base surface. A support foot provides a first load bearing surface. A lift mechanism during a step operation is configured to raise the support foot off of the base surface, lower the support foot onto the base surface, and raise the load off of the base surface. A first travel mechanism is configured to move the lift mechanism and attached load along a non-linear horizontal path and a second travel mechanism is configured to move the lift mechanism along a different horizontal path. Control system 105 in FIG. 1A is configured to operate the first travel mechanism and the second travel mechanism separately or simultaneously to move the lift mechanism along a selected horizontal path.

The first travel mechanism may be rotatably connected to the support foot. The first travel mechanism may include middle frame 108 and rotation cylinder 118 (FIG. 1A) and may support at least a portion of the load. A second travel mechanism may include roller assembly 106 and travel cylinders 114 and also may support a same portion of the load as the first travel mechanism. The second travel mechanism may move the lift mechanism along a linear horizontal path. Middle frame 108 in the first travel mechanism may be rotatably coupled to support foot 110 and roller assembly 106 in the second travel mechanism may move linearly over middle frame 108.

Travel Mechanism with Dual Bull Gears

Figure 10A:
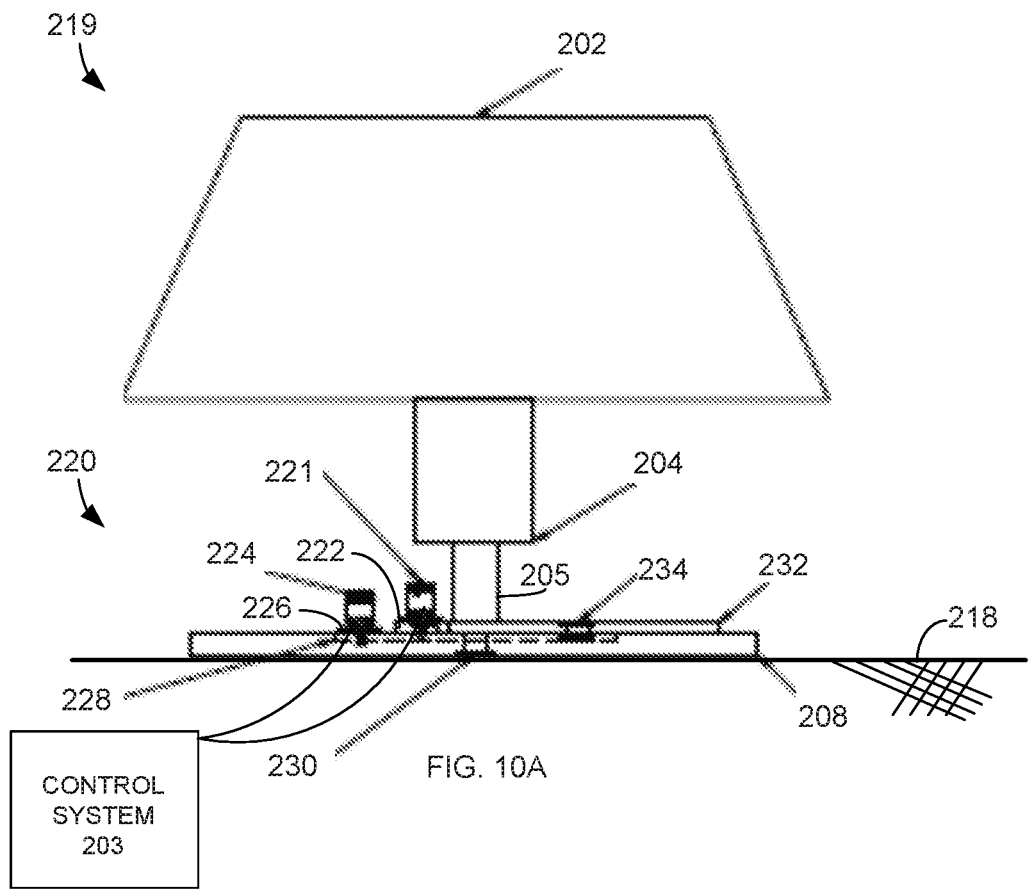
FIG. 10A shows a side view of a dual bull gear walking apparatus.
Figure 10B:
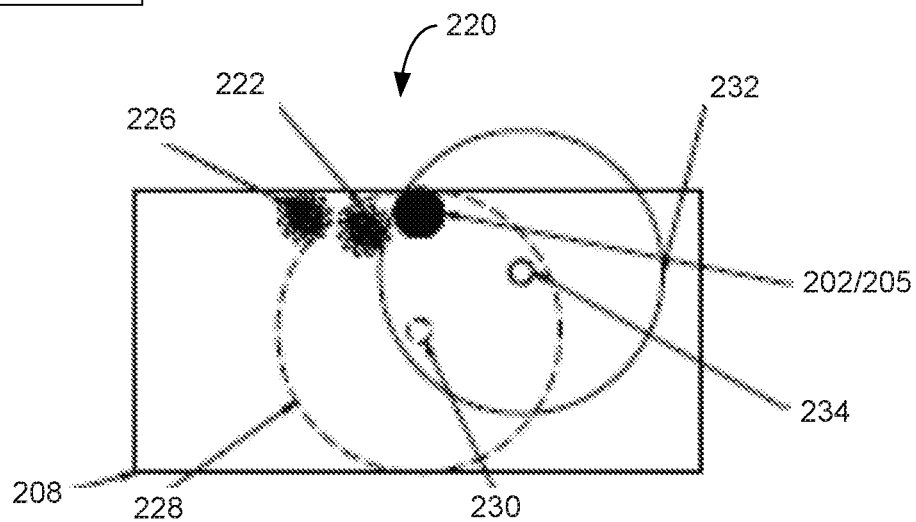
FIG. 10B shows a top view of the dual bull gear walking apparatus of FIG. 10A.

FIGS. 10A and 10B show a walking apparatus 219 that includes a unique dual bull gear circular travel mechanism 220. FIG. 10A is a side view of walking apparatus 219 and FIG. 10B is an upper plan view of travel mechanism 220.

Referring to FIGS. 10A and 10B, walking apparatus 219 includes a lift cylinder 204 that attaches at an upper end to a load or a load bearing frame 202. Lift rod 205 extends down out of lift cylinder 204 and is rotatably attached at a bottom end to an upper bull gear 232. Upper bull gear 232 is rotatably coupled to a lower bull gear 228 by an upper bull gear kingpin 234.

Lower bull gear 228 seats into a circular hole formed in the top surface of support foot 208. A top surface of lower bull gear 228 may extend substantially flush with the top surface of support foot 208. Lower bull gear 228 is rotatably coupled to support foot 208 by a lower king pin 230. Lower bull gear 228 is shown in dashed lines below for explanation purposes and to represent lower bull gear 228 being seated into a recess formed in support foot 208.

A lower pinion gear 226 is rotatably coupled to support foot 208 and is driven by a lower bull gear motor 224. Lower pinion gear 226 includes teeth that extend around an outside circumference and engage with teeth that extend around an outside circumference of lower bull gear 228. An upper pinion gear 222 is rotatably coupled to the top of lower bull gear 228 and is driven by an upper bull gear motor 221. Upper pinion gear 222 includes teeth that extend around an outside circumference and engage with teeth that extend around an outside circumference of upper bull gear 232.

Activating lower motor 224 rotates lower pinion gear 226 on support foot 208 about a vertical axis. Lower pinion gear 226 in turn rotates lower bull gear 228 in an opposite rotational direction on support foot 208. Activating upper motor 221 rotates upper pinion gear 222 on top of lower bull gear 228 about a vertical axis. Upper pinion gear 222 in turn rotates upper bull gear 232 in an opposite rotational direction on top of lower bull gear 228.

A control system 203 may include electrical and hydraulic equipment used to control walking apparatus 219 based on inputs from sensors located on walking apparatus 216 and based on control signals from a remote-control device (not shown). Electrical and/or hydraulic control lines may send control information and hydraulic pressure and flow to upper motor 221 and lower motor 224. Control system 203 is configured to operate the first travel mechanism comprising lower bull gear 228 and lower motor 224 and the second travel mechanism comprising upper bull gear 232 and upper motor 221 separately or simultaneously to move the lift mechanism 204/205 and load bearing frame 202 along a selectable horizontal path.

FIGS. 11-14 show how travel mechanism 220 moves load bearing frame 202 in selective linear, nonlinear, longitudinal, traverse, diagonal, and offset diagonal directions, respectively. FIGS. 11-14 are top sectional views of walking apparatus 219. As shown above in FIGS. 10A and 10B, load bearing frame 202 is attached to the top of lift cylinder 204 and lift cylinder 204 is attached to lift rod 205. Accordingly, any horizontal movement of lift rod 205 described below results in load bearing frame 202 moving in the same direction if load bearing frame 202 is lifted off of base surface 218 by lift cylinder 204, but results in support foot 208 moving in the opposite direction if load bearing frame 202 is lowered onto base surface by lift cylinder 204.

Referring to FIG. 11A support foot 208 may initially be raised above base surface 218 by lift cylinder 204 raising lift rod 205. Raising lift rod 205 lowers load bearing frame 202 onto base surface 218 and then raises support foot 208 above base surface 218.

Load bearing frame 202 is then pressing against the base surface 218 and lift rod 205 is held stationary by load bearing frame 202. Rotating upper bull gear 232 moves upper king pin 234 and attached lower bull gear 228 around lift rod 205. Rotating lower bull gear 228 moves lower king pin 230 and attached support foot 208 about upper king pin 234. Upper bull gear 232 and lower bull gear 228 are rotated in combination moving support foot 208 into an initial forward longitudinal position relative to lift rod 205 and load bearing frame 202 as shown in FIG. 11A.

Referring to FIG. 11B, lift rod 205 is extended lowering support foot 208 down onto base surface 218 and raising load bearing frame 202 off of base surface 218. Lower pinion gear 226 rotates in a counter clockwise direction rotating lower bull gear 228 in a clockwise direction 238. Lower kingpin 230 is attached to support foot 208 that is pressed against base surface 218. Accordingly, lower bull gear 228 rotates about lower kingpin 230 and also rotates upper kingpin 234 and attached upper bull gear 232 in a clockwise direction 238.

At the same time, at a previous time, or at a subsequent time, upper pinion gear 222 rotates in a clockwise direction rotating upper bull gear 232 in counter clockwise direction 240 about upper kingpin 234 while lower bull gear 228 is also moving upper bull gear 232 in clockwise direction 238. These rotational movements are synchronized to move lift rod 205 and attached load bearing frame 202 in a forward longitudinal direction 242 along a longitudinal axis of support foot 208.

FIG. 11C-11E show additional clockwise rotation 238 of lower bull gear 228 and counter clockwise rotation 240 of upper bull gear 232. The combined clockwise rotation 238 and 240 continue to move lift rod 205 and load bearing frame 202 in forward longitudinal direction 242 along the longitudinal axis of support foot 208.

After completion of the longitudinal step shown in FIGS. 11A-11E, lift rod 205 is raised lowering load bearing frame 202 back onto base surface 218 and raising support foot 208 above base surface 218. Upper pinion gear 222 is rotated in a counter clockwise direction causing upper bull gear 232 to rotate in a clockwise direction opposite to counter clockwise direction 240. Lower pinion gear 226 is rotated in a clockwise direction rotating lower bull gear 228 in a counter clockwise direction opposite to clockwise direction 238. The counter clockwise rotation of lower bull gear 228 and clockwise rotation of upper bull gear 232 move support foot 208 back into a forward longitudinal position relative to lift rod 205 and load bearing frame 202 as previously shown in FIG. 11A. Walking apparatus 219 then may perform another longitudinal step operation as described above.

FIGS. 12A-12E show how travel mechanism 220 moves load bearing frame 202 in a traverse direction. Referring to FIG. 12A, walking apparatus 219 may initially raise support foot 208 above base surface 218 raising lift rod 205 into lift cylinder 204. Raising lift rod 205 lowers load bearing frame 202 onto base surface 218 and then raises support foot 208 above base surface 218. Upper pinion gear 222 and lower pinion gear 226 rotate upper bull gear 232 and lower bull gear 228, respectively, so support foot 208 moves into a left transverse position relative to lift rod 205 and load bearing frame 202.

Referring to FIG. 12B, lift rod 205 is extended lowering support foot 208 down onto base surface 218 and raising load bearing frame 202 off of base surface 218. Lower pinion gear 226 rotates in a counter clockwise direction rotating lower bull gear 228 in clockwise direction 238 about lower kingpin 230. Lower kingpin 230 is rotationally attached to support foot 208 which is pressing against base surface 218. Accordingly, lower bull gear 228 also rotates upper kingpin 234 and attached upper bull gear 232 in clockwise direction 238 about lower kingpin 234. This also moves lift rod 205 and attached load bearing frame 202.

At the same time, at a previous time, or at a subsequent time, upper pinion gear 222 rotates in a clockwise direction rotating upper bull gear 232 in a counter clockwise direction about upper kingpin 234. Rotating lower bull gear 228 in clockwise direction 238, while also rotating upper bull gear 232 in counter clockwise direction 240 about upper kingpin 234, results in moving lift rod 205 and attached load bearing frame 202 in transverse direction 244 to port along a transverse/lateral axis of support foot 208.

FIGS. 12B-12E show additional clockwise rotation 238 of lower bull gear 228 and additional counter clockwise rotation 240 of upper bull gear 232 that combine to further move lift rod 205 and attached load bearing frame 202 in traverse direction 244 along the transverse axis of support foot 208.

After completion of any of the transverse stages FIG. 12B-12E, lift rod 205 is raised lowering load bearing frame 202 back onto base surface 218 and raising support foot 208 above base surface 218.

Upper pinion gear 222 is rotated in a counter clockwise direction rotating upper bull gear 232 in a clockwise direction opposite to counter clockwise direction 240 about lift rod 205. Lower pinion gear 226 is rotated in a clockwise direction rotating lower bull gear 228 about upper kingpin 234 in a counter clockwise direction opposite to clockwise direction 238 about upper kingpin 234.

Rotating upper bull gear 232 in the clockwise direction and rotating lower bull gear 228 in the counter clockwise direction move support foot 208 into a left lateral position relative to load bearing frame 202 similar to that shown in FIG. 12A. Walking apparatus 219 then may perform another transverse step operation as described above.

FIGS. 13A-13E show how travel mechanism 220 moves load bearing frame 202 in a diagonal direction. Referring to FIG. 13A, walking apparatus 219 may initially raise lift rod 205 lowering load bearing frame 202 onto base surface 218 and raising support foot 208 above base surface 218. Upper pinion gear 222 and lower pinion gear 226 rotate upper bull gear 232 and lower bull gear 228, respectively, so support foot 208 moves into a forward and left diagonal position relative to lift rod 205 and load bearing frame 202.

Referring to FIG. 13B, lift rod 205 is extended lowering support foot 208 down onto base surface 218 and raising load bearing frame 202 off of base surface 218. Lower pinion gear 226 rotates in a counter clockwise direction rotating lower bull gear 228 in clockwise direction 238 about lower kingpin 230. Lower kingpin 230 is rotationally attached to support foot 208 which is pressing against base surface 218. Accordingly, lower bull gear 228 rotates upper kingpin 234 and attached upper bull gear 232 in clockwise direction 238 about lower kingpin 234.

Upper pinion gear 222 rotates in a clockwise direction rotating upper bull gear 232 in counter clockwise direction 240 about upper kingpin 234. Upper kingpin 230 is rotatably attached to lower bull gear 228. Rotating lower bull gear 228 and upper bull gear 232 in clockwise direction 238 while at the same time rotating upper bull gear 232 in counter clockwise direction 240 moves lift rod 205 and attached load bearing frame 202 in diagonal direction 246.

FIGS. 13B-13E show additional clockwise rotation 238 of lower bull gear 228 and additional counter clockwise rotation 240 of upper bull gear 232 that combine to further move lift rod 205 and attached load bearing frame 202 in diagonal direction 246 across support foot 208.

After completion of any of the diagonal walking stages FIG. 13B-13E, lift rod 205 is raised lowering load bearing frame 202 back onto base surface 218 and raising support foot 208 above base surface 218. Upper pinion gear 222 is rotated in a counter clockwise direction rotating upper bull gear 232 in a clockwise direction opposite to counter clockwise direction 240 about lift rod 205. Lower pinion gear 222 rotates in a clockwise direction rotating lower bull gear 228 in a counter clockwise direction opposite to clockwise direction 238 about upper kingpin 234.

Rotating upper bull gear 232 in the clockwise direction and rotating lower bull gear 228 in the counter clockwise direction move support foot 208 into the position previously shown in FIG. 13A. Walking apparatus 219 then may perform another diagonal step operation as described above.

FIGS. 14A-14E show how travel mechanism 220 moves load bearing frame 202 in an offset diagonal direction. The diagonal direction 244 of load bearing frame 202 shown above in FIGS. 13A-13E extends diagonally over lower kingpin 230. However, the amount of rotation of lower bull gear 228 and upper bull gear 232 can be varied to change the offset and/or slope of the diagonal movement of load bearing frame 202.

For example, in FIG. 14B, lower pinion gear 226 may rotate at a different speed than upper pinion gear 222. Lower bull gear 228 then may move upper bull gear 232 and attached load bearing frame 202 in a lateral direction while upper bull gear 232 moves load bearing frame 202 in a forward longitudinal direction. Accordingly, load bearing frame 202 moves along a diagonal path offset from lower kingpin 230.

At some point, such as shown in FIG. 14D, upper pinion gear 222 may reverse direction and start rotating upper bull gear 232 in a clockwise direction to keep moving load bearing frame 202 along linear offset diagonal path 248.

After completion of any of the stages shown in FIGS. 14B-14E, lift rod 205 is raised lowering load bearing frame 202 back onto base surface 218 and raising support foot 208 above base surface 218. Upper bull gear 232 and lower bull gear 228 are rotated in the opposite directions as described above to move support foot 208 back into the left-forward position relative to lift rod 205 and load bearing frame 202 as shown in FIG. 14A.

Walking apparatus 219 may use any combination of longitudinal, traverse, diagonal, and/or offset diagonal rotations of upper bull gear 232 and lower bull gear 228 to move load bearing frame 202 along any path within the available space of the foot.

In summary, a first travel mechanism may include lower bull gear 228 and lower pinion gear 226. Lower bull 228 may be rotatably coupled to support foot 208 and move lift mechanism 204/205 and load bearing frame in a first non-linear direction. A second travel mechanism including upper bull gear 232 and upper pinion gear 222 may by rotatably coupled to lower bull gear 228 and move lift mechanism 204/205 and lower bearing 202 in a second nonlinear direction. Control system 203 in FIG. 10A is configured to operate the first travel mechanism and the second travel mechanism simultaneously to move the lift mechanism along a selected horizontal path.

It should also be understood that any number of walking apparatus 100 or 219 may be used to raise and move load bearing frame 101. Based on the direction of movement and the location, multiple walking apparatus 100 may move, rotate, or spin load bearing frame 101 in any variety of different directions. Using multiple walking apparatus to move a load is described in detail in U.S. Pat. Nos. 8,573, 334 and 8,561,733 which have both been incorporated by reference.

References above have been made in detail to preferred embodiment. Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A load transporting apparatus configured to move a load bearing frame carrying a load over a base surface, comprising:
   a support foot providing a first load bearing surface;
   a lift mechanism during a step operation configured to
      raise the support foot off of the base surface,
      lower the support foot onto the base surface, and
      raise the load off of the base surface;
   a first travel mechanism configured to move the lift mechanism along a non-linear horizontal path;
   a second travel mechanism configured to move the lift mechanism along a different horizontal path; and
   a control system configured to operate the first travel mechanism and the second travel mechanism simultaneously to move the lift mechanism along a selected horizontal path.

2. The apparatus of claim 1, wherein the first travel mechanism is rotatably connected to the support foot.

3. The apparatus of claim 1, wherein:
   the first travel mechanism supports at least a portion of the load; and
   the second travel mechanism supports a same portion of the load as the first travel mechanism.

4. The apparatus of claim 1, wherein the second travel mechanism is configured to move the lift mechanism along a linear horizontal path.

5. The apparatus of claim 1, wherein the second travel mechanism is configured to move the lift mechanism along a non-linear horizontal path.

6. The apparatus of claim 1, wherein the first travel mechanism includes a middle frame rotatably coupled to the support foot and the second travel mechanism moves linearly over the middle frame.

7. A load transporting apparatus configured to move a load bearing frame carrying a load over a base surface, comprising:
   a support foot;
   a lift mechanism during a step operation configured to
      raise the support foot off of the base surface,
      lower the support foot onto the base surface, and
      raise the load off of the base surface;
   a first travel mechanism configured to move the lift mechanism along a non-linear horizontal path while supporting at least a portion of the load;
   a second travel mechanism configured to move the lift mechanism along a different horizontal path while supporting the same portion of the load as the first travel mechanism; and
   a control system configured to operate the first travel mechanism and the second travel mechanism simultaneously to move the lift mechanism along a selectable horizontal path.

8. The apparatus of claim 7, wherein the first travel mechanism is rotatably connected to the support foot.

9. The apparatus of claim 7, where the second travel mechanism is configured to move the lift mechanism along a linear horizontal path.

10. The apparatus of claim 7, wherein the second travel mechanism is configured to move the lift mechanism along a non-linear horizontal path.

\* \* \* \* \*